US012811043B2

(12) United States Patent
Hsueh et al.

(10) Patent No.: US 12,811,043 B2
(45) Date of Patent: Nov. 24, 2026

(54) ROLLER MODULE

(71) Applicant: Primax Electronics Ltd., Taipei (TW)

(72) Inventors: Tsung-Wen Hsueh, Taipei (TW); Chun-Che Wu, Taipei (TW); Chien-Pang Chien, Taipei (TW); Sheng-An Tsai, Taipei (TW); Kai-Wen Lee, Taipei (TW); Li-Kuei Cheng, Taipei (TW); Heng-Tseng Liao, Taipei (TW)

(73) Assignee: Primax Electronics Ltd., Taipei (TW)

( * ) Notice: Subject to any disclaimer, the term of this patent is extended or adjusted under 35 U.S.C. 154(b) by 136 days.

(21) Appl. No.: 18/892,798

(22) Filed: Sep. 23, 2024

(65) Prior Publication Data

US 2026/0051430 A1 Feb. 19, 2026

(30) Foreign Application Priority Data

Aug. 15, 2024 (TW) ................................ 113130639

(51) Int. Cl.

| | |
|---|---|
| ***H01F 7/02*** | (2006.01) |
| ***G05G 1/015*** | (2008.04) |
| ***G05G 1/10*** | (2006.01) |
| ***G05G 5/03*** | (2008.04) |
| ***H01F 7/20*** | (2006.01) |
| *G06F 3/0362* | (2013.01) |

(52) U.S. Cl.

CPC ........... *H01F 7/0205* (2013.01); *G05G 1/015* (2013.01); *G05G 1/10* (2013.01); *G05G 5/03* (2013.01); *H01F 7/20* (2013.01); *G05G 2505/00* (2013.01); *G06F 3/0362* (2013.01)

(58) Field of Classification Search

None

See application file for complete search history.

(56) References Cited

U.S. PATENT DOCUMENTS 8,717,153 B2 * 5/2014 Kang ...................... G05G 5/03 345/157

11,061,493 B1 * 7/2021 Cheng .................. G06F 3/0383

FOREIGN PATENT DOCUMENTS

WO WO-2021123313 A1 * 6/2021 ............... G05G 5/12

* cited by examiner

*Primary Examiner* — Vicky A Johnson

(74) *Attorney, Agent, or Firm* — KIRTON McCONKIE; Evan R. Witt

(57) ABSTRACT

A roller module includes roller module includes a wheel disc and an electro-permanent magnet assembly. When the electro-permanent magnet assembly is operated in the first operating status, the electro-permanent magnet assembly provides a first magnetic attraction force in a first direction, and the electro-permanent magnet assembly provides a second magnetic attraction force to the wheel disc in a second direction. When the electro-permanent magnet assembly is operated in the second operating status, the electro-permanent magnet assembly provides a third magnetic attraction force to the wheel disc in the first direction, and the electro-permanent magnet assembly provides a fourth magnetic attraction force to the wheel disc in the second direction. The first magnetic attraction force is greater than the third magnetic attraction force. The second magnetic attraction force is greater than the fourth magnetic attraction force.

42 Claims, 26 Drawing Sheets

ROLLER MODULE

FIELD OF THE INVENTION

The present invention relates to a roller module, and more particularly to a roller module capable of being operated in a stepped rotation mode or a non-stepped rotation mode and also a human-machine interface device with the roller module.

BACKGROUND OF THE INVENTION

Nowadays, a human-machine interface device such as a mouse is equipped with a roller module. The roller module can be selectively operated in a stepped rotation mode or a non-stepped rotation mode. In order to achieve the function of selectively rotating the roller module in the stepped rotation mode or the non-stepped rotation mode, the structure of the wheel disc in the roller module needs to be largely changed. Due to this structural design, the rotational equilibrium of the wheel disc itself will be affected, and the durability of the wheel disc will be reduced.

For allowing the roller module to be selectively operated in the stepped rotation mode or the non-stepped rotation mode, the mechanism of the roller module needs to be further improved.

SUMMARY OF THE INVENTION

In order to overcome the drawbacks of the conventional technologies, the present invention provides a roller module. The roller module includes a wheel disc and an electro-permanent magnet assembly. When the wheel disc is in a stepped rotation mode, the electro-permanent magnet assembly provides axial rotation resistance forces to the wheel disc from both sides. When a reverse current flows through the coil, the wheel disc is not influenced by the electro-permanent magnet assembly. Consequently, the wheel disc can be rotated in a non-stepped rotation mode. The wheel disc can be pivotally coupled to a supporting base. Consequently, the stability and the durability of the wheel disc upon rotation can be maintained.

In accordance with an aspect of the present invention, a roller module is provided. The roller module includes a wheel disc and an electro-permanent magnet assembly. The wheel disc has magnetic conductivity and is rotatable along a rotation axis line. The wheel disc includes a first lateral disc part, plural first extension structures, a second lateral disc part and plural second extension structures. The first lateral disc part and the second lateral disc part are opposed to each other. The plural first extension structures are externally protruded from the first lateral disc part. The plural first extension structures are in a radial arrangement with the rotation axis line as a center. The plural second extension structures are externally protruded from the second lateral disc part. The plural second extension structures are in the radial arrangement with the rotation axis line as the center. The electro-permanent magnet assembly is selectively operated in a first operating status or a second operating status. When the electro-permanent magnet assembly is operated in the first operating status, the electro-permanent magnet assembly provides a first magnetic attraction force to at least one first extension structure of the plural first extension structures in a direction facing the first lateral disc part, and the electro-permanent magnet assembly provides a second magnetic attraction force to at least one second extension structure of the plural second extension structures in a direction facing the second lateral disc part. When the electro-permanent magnet assembly is operated in the second operating status, the electro-permanent magnet assembly provides a third magnetic attraction force to at least one first extension structure of the plural first extension structures in the direction facing the first lateral disc part, and the electro-permanent magnet assembly provides a fourth magnetic attraction force to at least one second extension structure of the plural second extension structures in the direction facing the second lateral disc part. The first magnetic attraction force is greater than the third magnetic attraction force, and the second magnetic attraction force is greater than the fourth magnetic attraction force.

In an embodiment, the electro-permanent magnet assembly includes a first permanent magnet, a coil, a second permanent magnet, a third permanent magnet, a first magnetic conduction block and a second magnetic conduction block. The first permanent magnet has a first magnetic pole terminal and a second magnetic pole terminal. The coil is wound around the first permanent magnet. The second permanent magnet has a third magnetic pole terminal and a fourth magnetic pole terminal. The third permanent magnet has a fifth magnetic pole terminal and a sixth magnetic pole terminal. The first magnetic conduction block is magnetically coupled with the first magnetic pole terminal and the third magnetic pole terminal. The second magnetic conduction block is magnetically coupled with the second magnetic pole terminal and the sixth magnetic pole terminal.

In an embodiment, the first magnetic conduction block includes a first connecting part and a first clamping part, and the second magnetic conduction block includes a second connecting part and a second clamping part. The first connecting part is connected with the first magnetic pole terminal and the third magnetic pole terminal. The first clamping part is extended from the first connecting part and extended in a direction toward the first lateral disc part. The first clamping part is located near at least one first extension structure of the plural first extension structures. The second connecting part is connected with the second magnetic pole terminal and the sixth magnetic pole terminal. The second clamping part is extended from the second connecting part and extended in a direction toward the second lateral disc part. The second clamping part is located near at least one second extension structure of the plural second extension structures.

In an embodiment, the first clamping part includes plural first claws, and each of the plural first claws is located near the corresponding first extension structure of the plural first extension structures. In addition, the second clamping part includes plural second claws, and each of the plural second claws is located near the corresponding second extension structure of the plural second extension structures.

In an embodiment, the plural first claws are in the radial arrangement with the rotation axis line as the center, and the plural second claws are in the radial arrangement with the rotation axis line as the center.

In an embodiment, when the electro-permanent magnet assembly is operated in the first operating status, a magnetic polarity of the first magnetic pole terminal, a magnetic polarity of the third magnetic pole terminal and a magnetic polarity of the fifth magnetic pole terminal are identical. When the electro-permanent magnet assembly is operated in the second operating status, a magnetic polarity of the second magnetic pole terminal, the magnetic polarity of the third magnetic pole terminal and the magnetic polarity of the fifth magnetic pole terminal are identical.

In an embodiment, when the electro-permanent magnet assembly is operated in the first operating status, the first magnetic pole terminal is an S pole terminal, the second magnetic pole terminal is an N pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal. When the electro-permanent magnet assembly is operated in the second operating status, the first magnetic pole terminal is the N pole terminal, the second magnetic pole terminal is the S pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal.

In an embodiment, when the electro-permanent magnet assembly is operated in the first operating status, the first magnetic pole terminal is an N pole terminal, the second magnetic pole terminal is an S pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal. When the electro-permanent magnet assembly is operated in the second operating status, the first magnetic pole terminal is the S pole terminal, the second magnetic pole terminal is the N pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal.

In an embodiment, when a current flows through the coil, an operating status of the electro-permanent magnet assembly is switched from the first operating status to the second operating status.

In an embodiment, the roller module further includes a magnetic conduction sheet, and the fourth magnetic pole terminal and the fifth magnetic pole terminal are magnetically coupled with each other through the magnetic conduction sheet.

In an embodiment, the wheel disc further includes a pivotal part and an outer disc part, and the outer disc part is arranged between the first lateral disc part and the second lateral disc part.

In an embodiment, the roller module further includes a supporting base, and the supporting base includes an accommodation recess, a first pivotal hole and a second pivotal hole. The wheel disc is pivotally coupled to the supporting base through the pivotal part. A portion of the wheel disc is received within the accommodation recess. The first pivotal hole and the second pivotal hole are respectively located beside two opposite sides of the accommodation recess.

In an embodiment, the pivotal part includes a first rotation shaft and a second rotation shaft. The first rotation shaft is externally protruded from the first lateral disc part of the wheel disc. The second rotation shaft is externally protruded from the second lateral disc part of the wheel disc. A distal end of the first rotation shaft is inserted into the first pivotal hole. A distal end of the second rotation shaft is inserted into the second pivotal hole.

In an embodiment, the roller module further includes a rotation sensor, and the rotation sensor includes a magnetic turntable and a sensing chip. A rotation state of the wheel disc is detected by the sensing chip. The magnetic turntable is sheathed around the first rotation shaft and synchronously rotated with the magnetic turntable.

In an embodiment, the first extension structures and the second extension structures are tapered structures. The first extension structures are tapered in a direction away from the first lateral disc part of the wheel disc. The second extension structures are tapered in a direction away from the second lateral disc part of the wheel disc.

In accordance with another aspect of the present invention, a roller module is provided. The roller module includes a wheel disc and an electro-permanent magnet assembly. The wheel disc has magnetic conductivity and is rotatable along a rotation axis line. The wheel disc includes a first lateral disc part, plural extension structures and a second lateral disc part. The first lateral disc part and the second lateral disc part are opposed to each other. The plural extension structures are externally protruded from the second lateral disc part. The plural extension structures are in a radial arrangement with the rotation axis line as a center. The electro-permanent magnet assembly is selectively operated in a first operating status or a second operating status. When the electro-permanent magnet assembly is operated in the first operating status, the electro-permanent magnet assembly provides a first magnetic attraction force to the wheel disc in a direction facing the first lateral disc part, and the electro-permanent magnet assembly provides a second magnetic attraction force to at least one extension structure of the plural extension structures in a direction facing the second lateral disc part. When the electro-permanent magnet assembly is operated in the second operating status, the electro-permanent magnet assembly provides a third magnetic attraction force to the wheel disc in the direction facing the first lateral disc part, and the electro-permanent magnet assembly provides a fourth magnetic attraction force to at least one extension structure of the plural extension structures in the direction facing the second lateral disc part. The first magnetic attraction force is greater than the third magnetic attraction force. The second magnetic attraction force is greater than the fourth magnetic attraction force.

In an embodiment, the electro-permanent magnet assembly includes a first permanent magnet, a coil, a second permanent magnet, a third permanent magnet, a first magnetic conduction block and a second magnetic conduction block. The first permanent magnet has a first magnetic pole terminal and a second magnetic pole terminal. The coil is wound around the first permanent magnet. The second permanent magnet has a third magnetic pole terminal and a fourth magnetic pole terminal. The third permanent magnet has a fifth magnetic pole terminal and a sixth magnetic pole terminal. The first magnetic conduction block is magnetically coupled with the first magnetic pole terminal and the third magnetic pole terminal. The second magnetic conduction block is magnetically coupled with the second magnetic pole terminal and the sixth magnetic pole terminal.

In an embodiment, the first magnetic conduction block includes a first connecting part and a first clamping part, and the second magnetic conduction block includes a second connecting part and a second clamping part. The first connecting part is connected with the first magnetic pole terminal and the third magnetic pole terminal. The first clamping part is extended from the first connecting part and extended in a direction toward the first lateral disc part. The first clamping part is located near the first lateral disc part. The second connecting part is connected with the second magnetic pole terminal and the sixth magnetic pole terminal. The second clamping part is extended from the second connecting part and extended in a direction toward the second lateral disc part. The second clamping part is located near at least one extension structure of the plural extension structures.

In an embodiment, the second clamping part includes plural second claws, and each of the plural second claws is located near the corresponding extension structure of the plural extension structures.

In an embodiment, the plural second claws are in the radial arrangement with the rotation axis line as the center.

In an embodiment, when the electro-permanent magnet assembly is operated in the first operating status, a magnetic polarity of the first magnetic pole terminal, a magnetic polarity of the third magnetic pole terminal and a magnetic polarity of the fifth magnetic pole terminal are identical. When the electro-permanent magnet assembly is operated in the second operating status, a magnetic polarity of the second magnetic pole terminal, the magnetic polarity of the third magnetic pole terminal and the magnetic polarity of the fifth magnetic pole terminal are identical.

In an embodiment, when the electro-permanent magnet assembly is operated in the first operating status, the first magnetic pole terminal is an S pole terminal, the second magnetic pole terminal is an N pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal. When the electro-permanent magnet assembly is operated in the second operating status, the first magnetic pole terminal is the N pole terminal, the second magnetic pole terminal is the S pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal.

In an embodiment, when the electro-permanent magnet assembly is operated in the first operating status, the first magnetic pole terminal is an N pole terminal, the second magnetic pole terminal is an S pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal. When the electro-permanent magnet assembly is operated in the second operating status, the first magnetic pole terminal is the S pole terminal, the second magnetic pole terminal is the N pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal.

In an embodiment, when a current flows through the coil, an operating status of the electro-permanent magnet assembly is switched from the first operating status to the second operating status.

In an embodiment, the roller module further includes a magnetic conduction sheet, and the fourth magnetic pole terminal and the fifth magnetic pole terminal are magnetically coupled with each other through the magnetic conduction sheet.

In an embodiment, the wheel disc further includes a pivotal part and an outer disc part, and the outer disc part is arranged between the first lateral disc part and the second lateral disc part.

In an embodiment, the roller module further includes a supporting base, and the supporting base includes an accommodation recess, a first pivotal hole and a second pivotal hole. The wheel disc is pivotally coupled to the supporting base through the pivotal part. A portion of the wheel disc is received within the accommodation recess. The first pivotal hole and the second pivotal hole are respectively located beside two opposite sides of the accommodation recess.

In an embodiment, the pivotal part includes a first rotation shaft and a second rotation shaft. The first rotation shaft is externally protruded from the first lateral disc part of the wheel disc. The second rotation shaft is externally protruded from the second lateral disc part of the wheel disc. A distal end of the first rotation shaft is inserted into the first pivotal hole. A distal end of the second rotation shaft is inserted into the second pivotal hole.

In an embodiment, the roller module further includes a rotation sensor, and the rotation sensor includes a magnetic turntable and a sensing chip. A rotation state of the wheel disc is detected by the sensing chip. The magnetic turntable is sheathed around the first rotation shaft and synchronously rotated with the magnetic turntable.

In an embodiment, the extension structures are tapered structures, and the extension structures are tapered in a direction away from the first lateral disc part of the wheel disc.

In accordance with another aspect of the present invention, a roller module is provided. The roller module includes a wheel disc and an electro-permanent magnet assembly. The wheel disc has magnetic conductivity and is rotatable along a rotation axis line. The wheel disc includes a pivotal part, plural wheel spokes and an outer disc part. The plural wheel spokes are arranged between the pivotal part and the outer disc part. The plural wheel spokes are radially extended from the pivotal part and in a radial arrangement. The electro-permanent magnet assembly is selectively operated in a first operating status or a second operating status. When the electro-permanent magnet assembly is operated in the first operating status, the electro-permanent magnet assembly provides a first magnetic attraction force to at least one wheel spoke of the plural wheel spokes in a first direction parallel with the rotation axis line, and the electro-permanent magnet assembly provides a second magnetic attraction force to at least one wheel spoke of the plural wheel spokes in a second direction parallel with the rotation axis line. The first direction and the second direction are opposed to each other. When the electro-permanent magnet assembly is operated in the second operating status, the electro-permanent magnet assembly provides a third magnetic attraction force to at least one wheel spoke of the plural wheel spokes in the first direction, and the electro-permanent magnet assembly provides a fourth magnetic attraction force to at least one wheel spoke of the plural wheel spokes in the second direction. The first magnetic attraction force is greater than the third magnetic attraction force. The second magnetic attraction force is greater than the fourth magnetic attraction force.

In an embodiment, the electro-permanent magnet assembly includes a first permanent magnet, a coil, a second permanent magnet, a third permanent magnet, a first magnetic conduction block and a second magnetic conduction block. The first permanent magnet has a first magnetic pole terminal and a second magnetic pole terminal. The coil is wound around the first permanent magnet. The second permanent magnet has a third magnetic pole terminal and a fourth magnetic pole terminal. The third permanent magnet has a fifth magnetic pole terminal and a sixth magnetic pole terminal. The first magnetic conduction block is magnetically coupled with the first magnetic pole terminal and the third magnetic pole terminal. The second magnetic conduction block is magnetically coupled with the second magnetic pole terminal and the sixth magnetic pole terminal.

In an embodiment, the first magnetic conduction block includes a first connecting part and a first clamping part, and the second magnetic conduction block includes a second connecting part and a second clamping part. The first connecting part is connected with the first magnetic pole terminal and the third magnetic pole terminal. The first clamping part is extended in a direction toward the first lateral disc part. The first clamping part is located near at least one wheel spoke of the plural wheel spokes. The second connecting part is connected with the second magnetic pole terminal and the sixth magnetic pole terminal. The second clamping part is extended in a direction toward the second lateral disc part. The second clamping part is located near at least one wheel spoke of the plural wheel spokes.

In an embodiment, the first clamping part includes plural first claws, and each of the plural first claws is located near the corresponding at least one wheel spoke of the plural wheel spokes. In addition, the second clamping part includes plural second claws, and each of the plural second claws is located near the corresponding at least one wheel spoke of the plural wheel spokes.

In an embodiment, the plural first claws are in the radial arrangement with the rotation axis line as the center, and the plural second claws are in the radial arrangement with the rotation axis line as the center.

In an embodiment, when the electro-permanent magnet assembly is operated in the first operating status, a magnetic polarity of the first magnetic pole terminal, a magnetic polarity of the third magnetic pole terminal and a magnetic polarity of the fifth magnetic pole terminal are identical. When the electro-permanent magnet assembly is operated in the second operating status, a magnetic polarity of the second magnetic pole terminal, the magnetic polarity of the third magnetic pole terminal and the magnetic polarity of the fifth magnetic pole terminal are identical.

In an embodiment, when the electro-permanent magnet assembly is operated in the first operating status, the first magnetic pole terminal is an S pole terminal, the second magnetic pole terminal is an N pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal. When the electro-permanent magnet assembly is operated in the second operating status, the first magnetic pole terminal is the N pole terminal, the second magnetic pole terminal is the S pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal.

In an embodiment, when the electro-permanent magnet assembly is operated in the first operating status, the first magnetic pole terminal is an N pole terminal, the second magnetic pole terminal is an S pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal. When the electro-permanent magnet assembly is operated in the second operating status, the first magnetic pole terminal is the S pole terminal, the second magnetic pole terminal is the N pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal.

In an embodiment, when a current flows through the coil, an operating status of the electro-permanent magnet assembly is switched from the first operating status to the second operating status.

In an embodiment, the roller module further includes a magnetic conduction sheet, and the fourth magnetic pole terminal and the fifth magnetic pole terminal are magnetically coupled with each other through the magnetic conduction sheet.

In an embodiment, the roller module further includes a supporting base, and the supporting base includes an accommodation recess, a first pivotal hole and a second pivotal hole. The wheel disc is pivotally coupled to the supporting base through the pivotal part. A portion of the wheel disc is received within the accommodation recess. The first pivotal hole and the second pivotal hole are respectively located beside two opposite sides of the accommodation recess.

In an embodiment, the pivotal part includes a first rotation shaft and a second rotation shaft. The first rotation shaft is externally protruded from the first lateral disc part of the wheel disc. The second rotation shaft is externally protruded from the second lateral disc part of the wheel disc. A distal end of the first rotation shaft is inserted into the first pivotal hole. A distal end of the second rotation shaft is inserted into the second pivotal hole.

In an embodiment, the roller module further includes a rotation sensor, and the rotation sensor includes a magnetic turntable and a sensing chip. A rotation state of the wheel disc is detected by the sensing chip. The magnetic turntable is sheathed around the first rotation shaft and synchronously rotated with the magnetic turntable.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
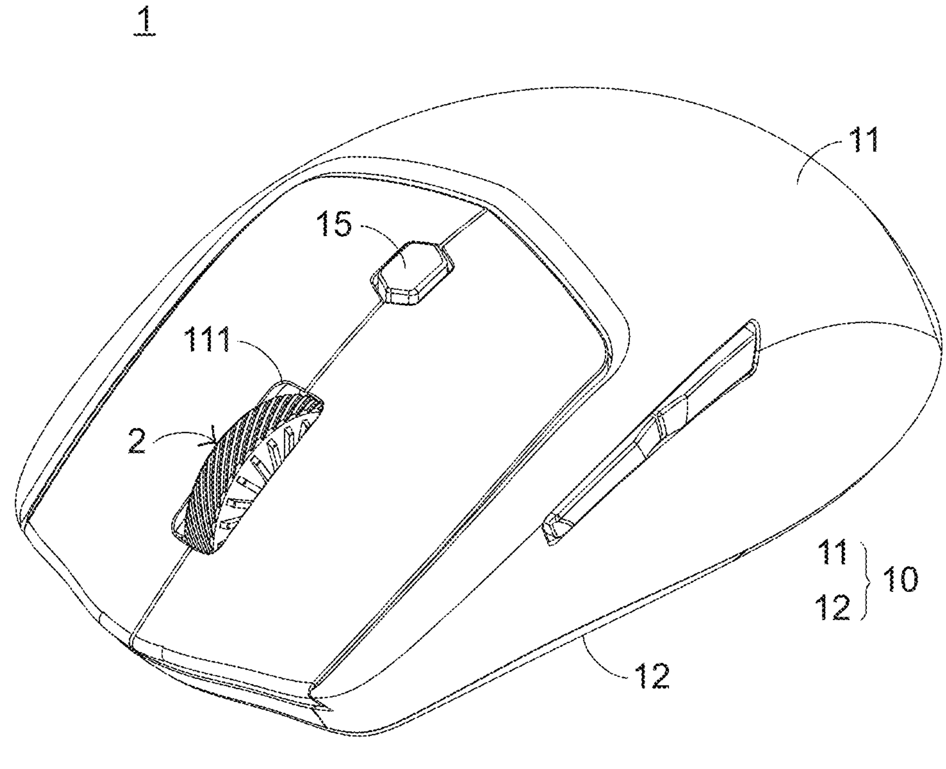
FIG. 1 is a schematic perspective view illustrating a roller module according to a first embodiment of the present invention, wherein the roller module is installed in an inner space of a mouse.
Figure 2:
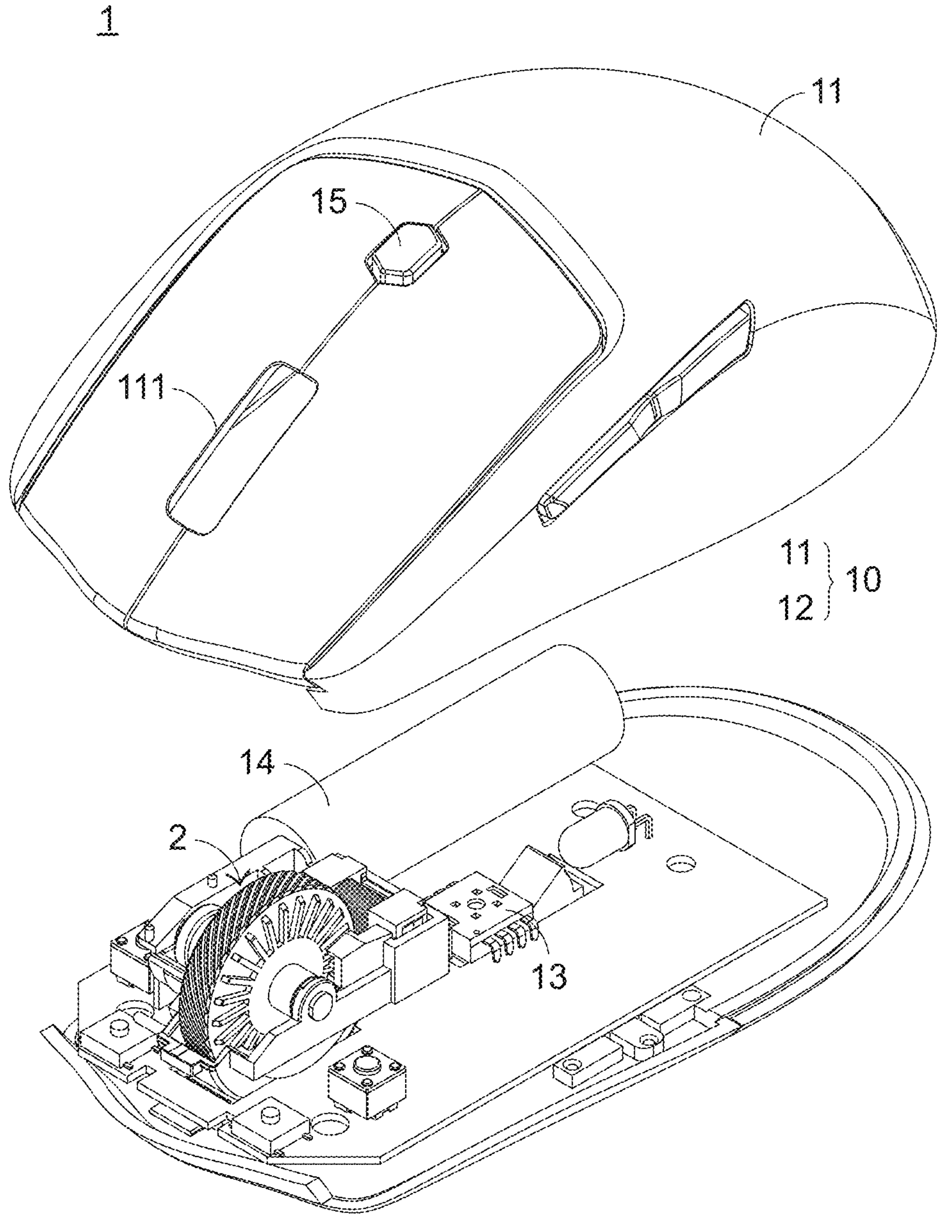
FIG. 2 is a schematic exploded view illustrating the mouse shown in FIG. 1.
Figure 3:
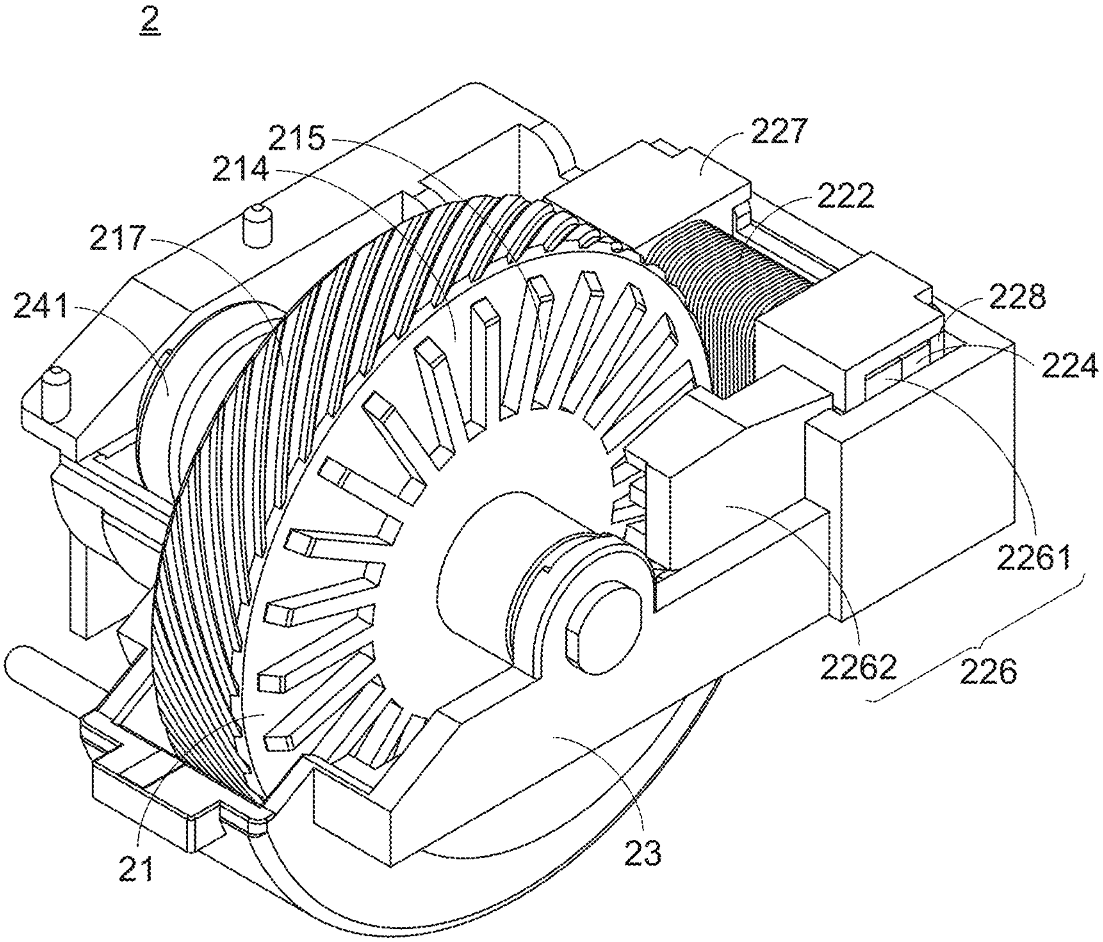
FIG. 3 is a schematic perspective view illustrating the structure of the roller module according to the first embodiment of the present invention.
Figure 4:
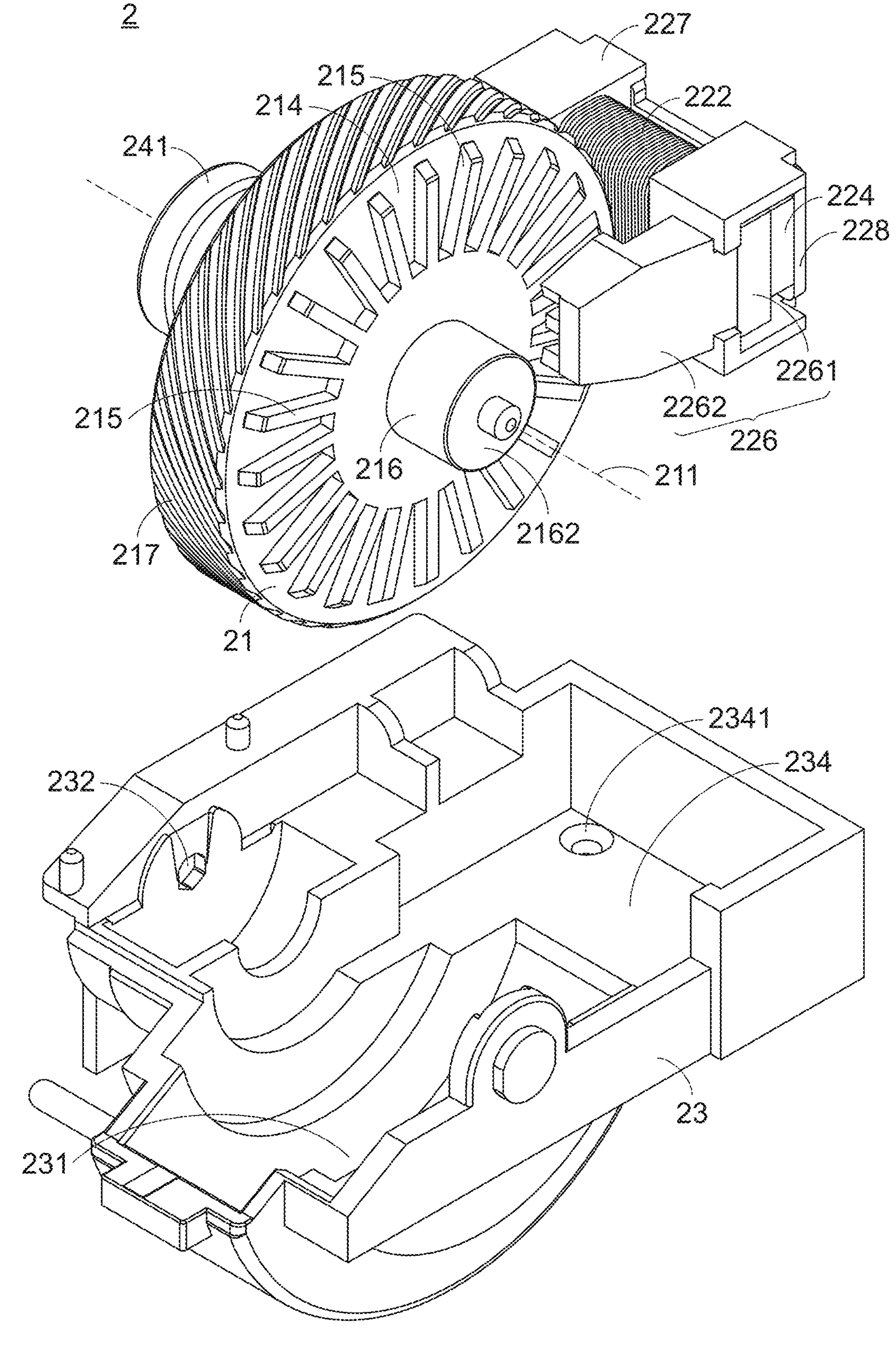
FIG. 4 is a schematic exploded view illustrating the structure of the roller module shown in FIG. 3.
Figure 5:
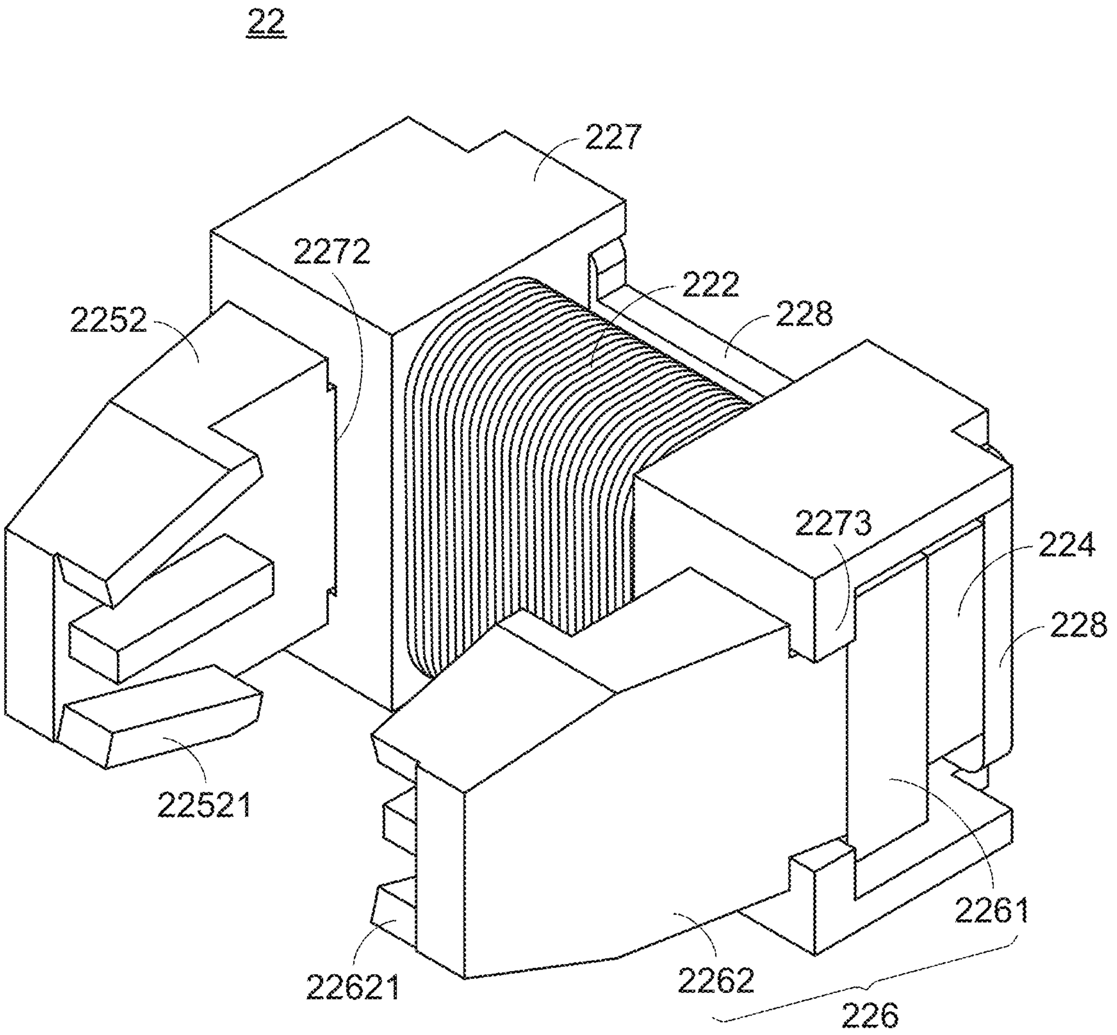
FIG. 5 is a schematic perspective view illustrating the structure of an electro-permanent magnet assembly in the roller module shown in FIG. 4.
Figure 6:
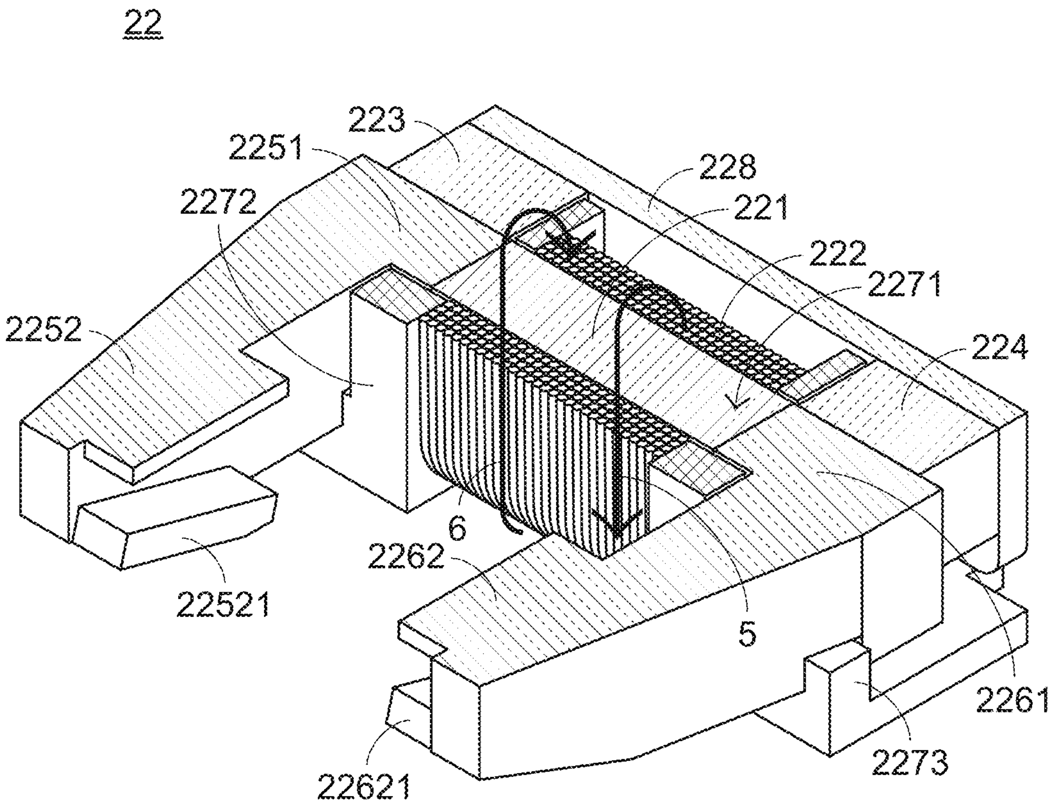
FIG. 6 is a schematic cutaway view illustrating the electro-permanent magnet assembly shown in FIG. 4.
Figure 7:
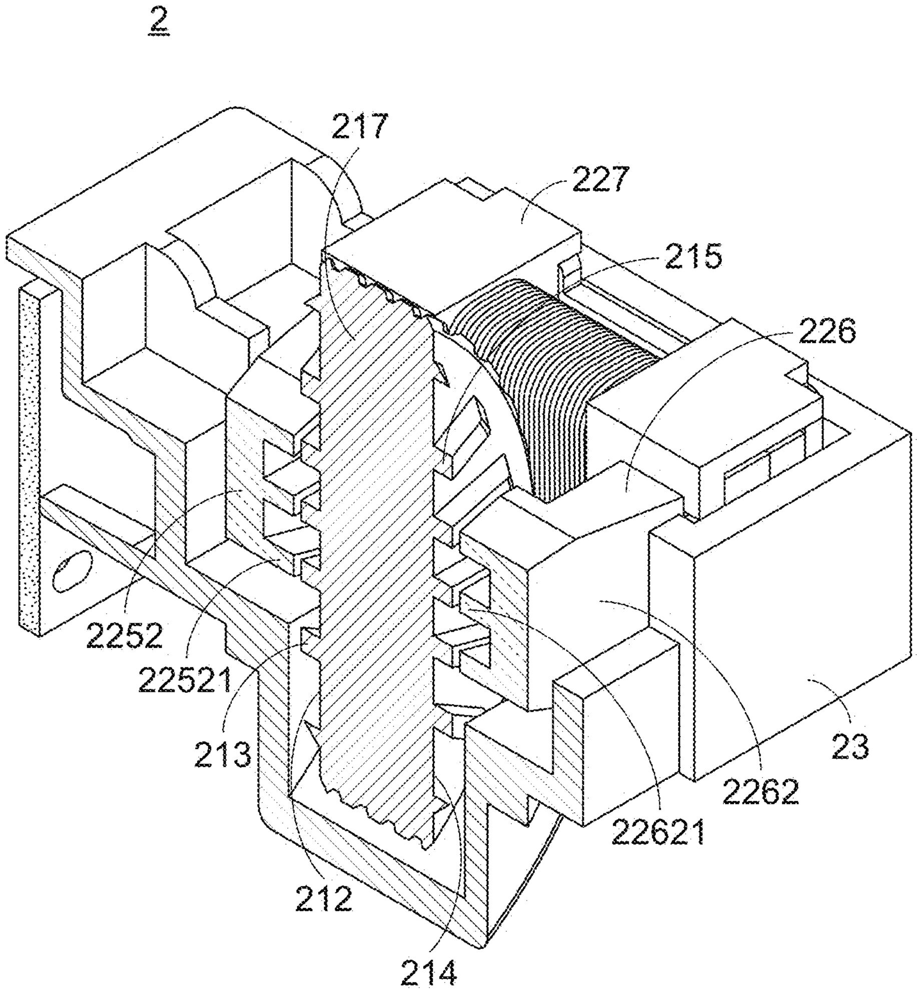
FIG. 7 is a schematic cutaway view illustrating the roller module shown in FIG. 3 and taken along a viewpoint.
Figure 8:
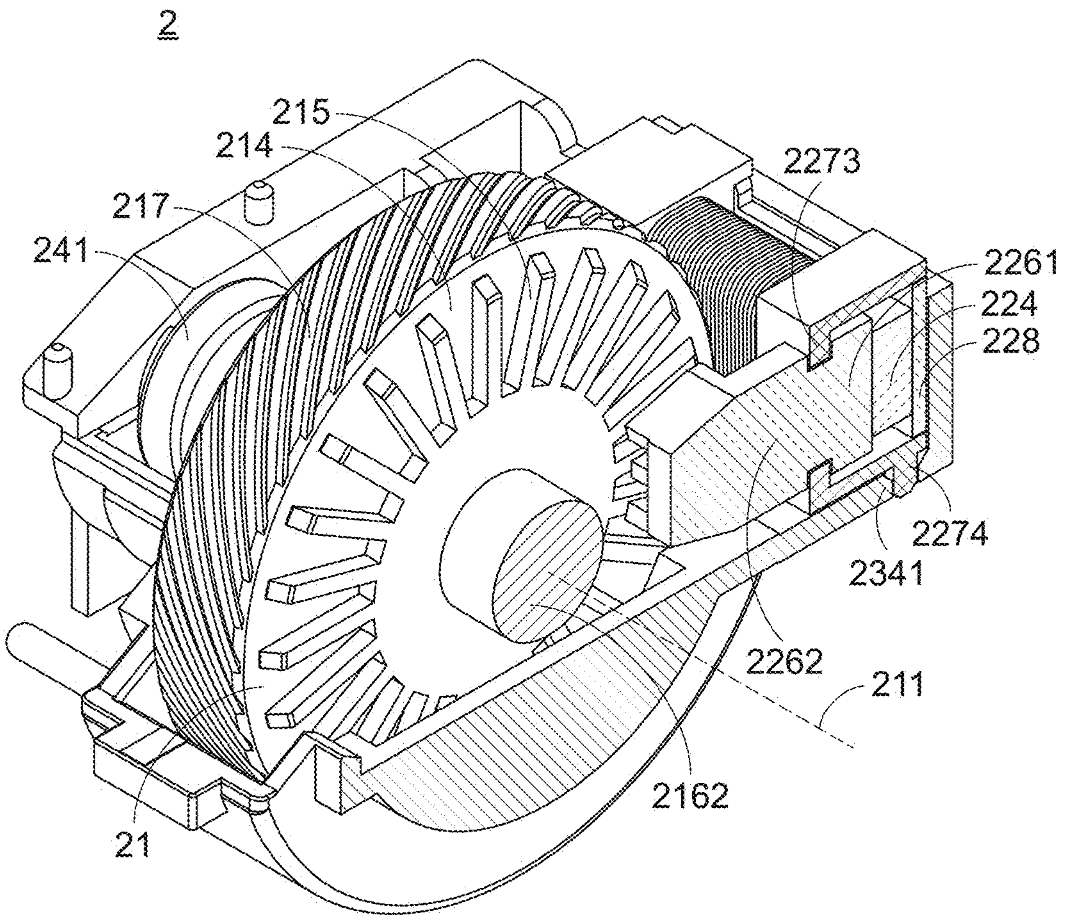
FIG. 8 is a schematic cutaway view illustrating the roller module shown in FIG. 3 and taken along another viewpoint.
Figure 9:
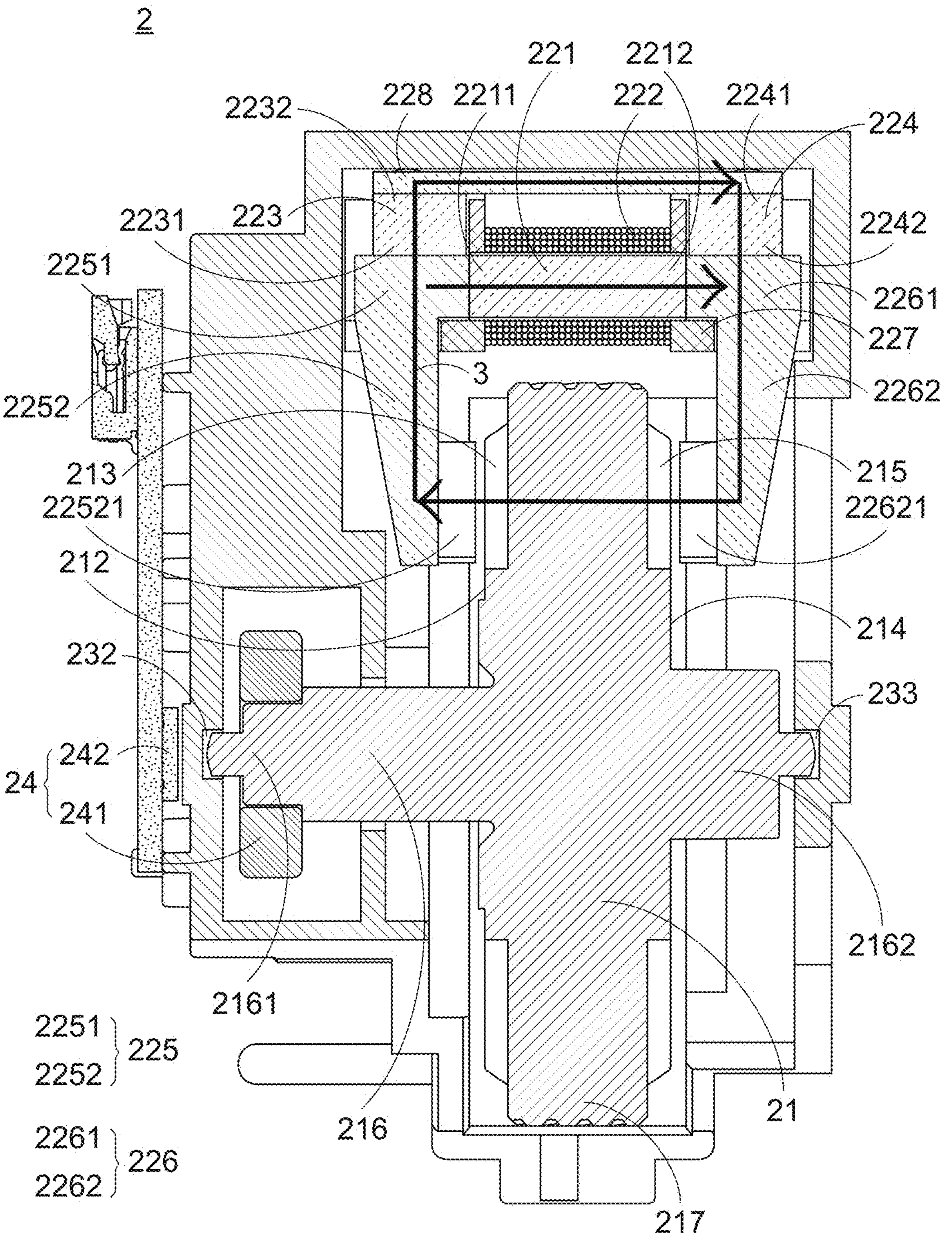
FIG. 9 is a schematic cross-sectional view illustrating the electro-permanent magnet assembly in the roller module shown in FIG. 3 and in a first operating status.
Figure 10:
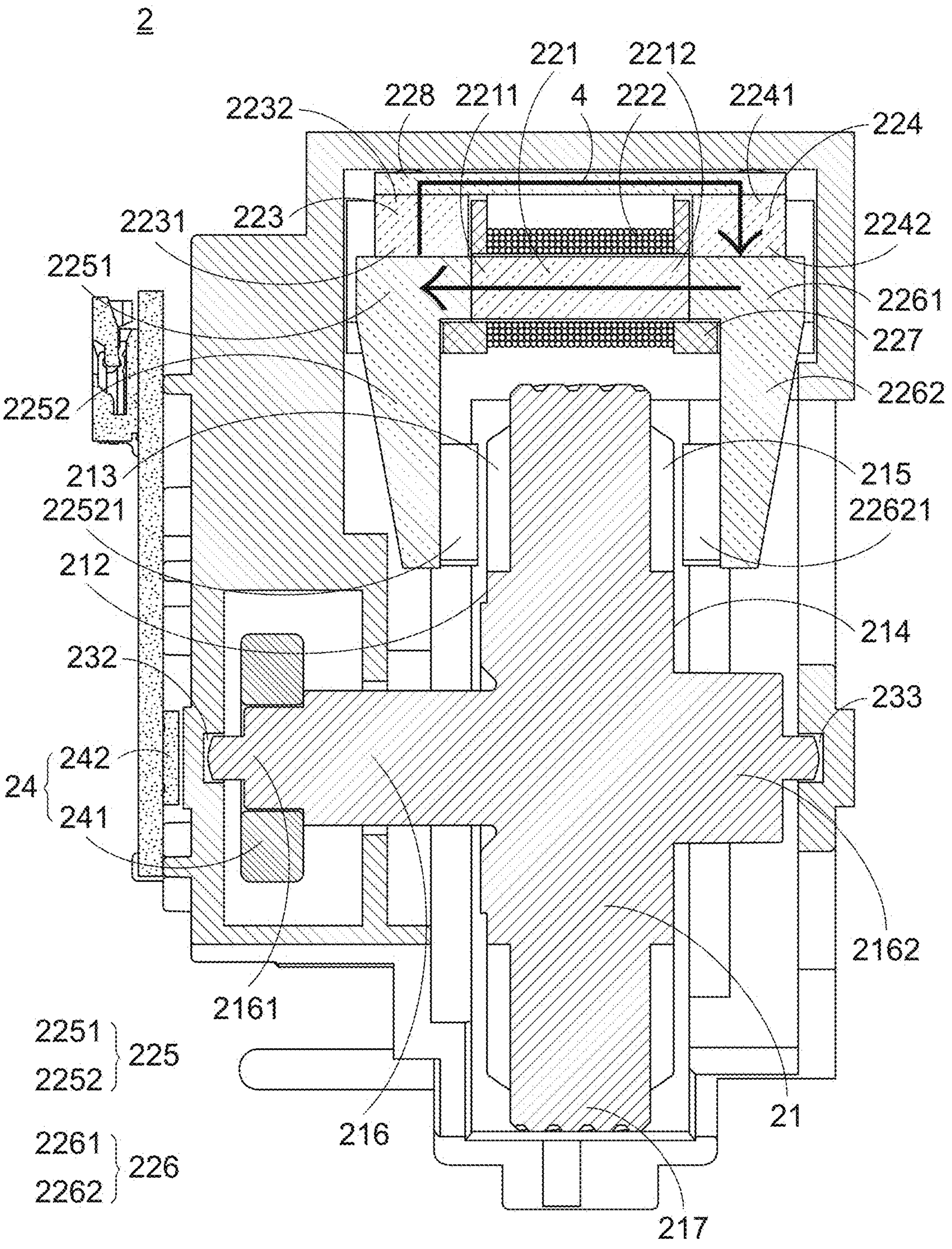
FIG. 10 is a schematic cross-sectional view illustrating the electro-permanent magnet assembly in the roller module shown in FIG. 3 and in a second operating status.

FIG. 1 is a schematic perspective view illustrating a roller module according to a first embodiment of the present invention, wherein the roller module is installed in an inner space of a mouse. FIG. 2 is a schematic exploded view illustrating the mouse shown in FIG. 1. FIG. 3 is a schematic perspective view illustrating the structure of the roller module according to the first embodiment of the present invention. FIG. 4 is a schematic exploded view illustrating the structure of the roller module shown in FIG. 3. FIG. 5 is a schematic perspective view illustrating the structure of an electro-permanent magnet assembly in the roller module shown in FIG. 4. FIG. 6 is a schematic cutaway view illustrating the electro-permanent magnet assembly shown in FIG. 4. FIG. 7 is a schematic cutaway view illustrating the roller module shown in FIG. 3 and taken along a viewpoint. FIG. 8 is a schematic cutaway view illustrating the roller module shown in FIG. 3 and taken along another viewpoint. FIG. 9 is a schematic cross-sectional view illustrating the electro-permanent magnet assembly in the roller module shown in FIG. 3 and in a first operating status. FIG. 10 is a schematic cross-sectional view illustrating the electro-permanent magnet assembly in the roller module shown in FIG. 3 and in a second operating status.

The present invention provides a roller module. An example of a roller module according to a first embodiment of the present invention will be described with reference to FIGS. 1 to 10. The roller module can be installed in a human-machine interface device. For example, the human-machine interface device is an input device (e.g., a mouse or a keyboard) or a control device (e.g., a live streaming controller or a live production switcher). In this embodiment, the roller module is installed in an inner space of a mouse. It is noted that the application of the roller module is not restricted.

The mouse 1 includes a housing 10. The housing 10 includes an upper cover 11, a lower cover 12, a displacement sensing assembly 13 and a battery 14. The upper cover 11 has an opening 111. A portion of the roller module 2 is exposed outside through the opening 111. For example, a wheel disc of the roller module 2 is exposed outside through the opening 111, and thus the wheel disc can be touched and operated by the user. The displacement sensing assembly 13 includes an X-Y axis displacement sensor, a circuit board and any other appropriate component.

The roller module 2 includes a wheel disc 21, an electro-permanent magnet assembly 22, a supporting base 23 and a rotation sensor 24. The supporting base 23 includes an accommodation recess 231, a first pivotal hole 232, a second pivotal hole 233 and a carrier 234. The first pivotal hole 232 and the second pivotal hole 233 are respectively located beside two opposite sides of the accommodation recess 231. The carrier 234 is located beside the accommodation recess 231 and extended radially. In addition, at least one positioning hole 2341 is formed in the carrier 234.

The wheel disc 21 has magnetic conductivity. In addition, the wheel disc 21 is pivotally coupled to the supporting base 23 through a pivotal part 216. A portion of the wheel disc 21 is received within the accommodation recess 231. The wheel disc 21 can be rotated along a rotation axis line 211. Hereinafter, the direction parallel to the rotation axis line 211 is referred as an axial direction, and the direction perpendicular to the rotation axis line 211 is referred as a radial direction.

The wheel disc 21 includes a first lateral disc part 212, plural first extension structures 213, a second lateral disc part 214, plural second extension structures 215, the pivotal part 216 and an outer disc part 217. The first lateral disc part 212 and the second lateral disc part 214 are opposed to each other. The plural first extension structures 213 are externally protruded from the first lateral disc part 212. In addition, the plural first extension structures 213 are in a radial arrangement with the rotation axis line 211 as the center. The plural second extension structures 215 are externally protruded from the second lateral disc part 214. In addition, the plural second extension structures 215 are also in a radial arrangement with the rotation axis line 211 as the center.

The pivotal part 216 includes a first rotation shaft 2161 and a second rotation shaft 2162. The first rotation shaft 2161 is externally protruded from a middle region of the first lateral disc part 212 of the wheel disc 21. The second rotation shaft 2162 is externally protruded from a middle region of the second lateral disc part 214 of the wheel disc 21. The distal end of the first rotation shaft 2161 is inserted into the first pivotal hole 232 of the supporting base 23. The distal end of the second rotation shaft 2162 is inserted into the second pivotal hole 233 of the supporting base 23. Since the wheel disc 21 is firmly pivotally coupled to the supporting base 23 through the first rotation shaft 2161 and the second rotation shaft 2162 on both sides of the wheel disc 21, the stability and the durability of the wheel disc 21 upon rotation can be maintained. Consequently, the presence of the electro-permanent magnet assembly 22 will not influence the original rotation structure and mechanism of the wheel disc 21. That is, it is not necessary to change the original rotation structure and mechanism of the wheel disc 21, and it is not necessary to enlarge the wheel disc 21 or retain a large internal space to accommodate the electro-permanent magnet assembly 22.

The outer disc part 217 is arranged between the first lateral disc part 212 and the second lateral disc part 214. When the roller module 2 is operated by the user, the outer disc part 217 is touched by the user's finger. Optionally, the outer disc part 217 is additionally equipped with an anti-slip ring, and the outer disc part 217 is covered with an anti-slip ring. When the anti-slip ring is touched by the user's finger, another operating feel is provided to the user.

In an embodiment, the rotation sensor 24 includes a magnetic turntable 241 and a sensing chip 242. The magnetic turntable 241 is divided into at least one N-pole region and one S-pole region. For example, the sensing chip 242 is a Hall IC. The magnetic turntable 241 is sheathed around and fixed on the first rotation shaft 2161. Consequently, the magnetic turntable 241 and the wheel disc 21 can be rotated synchronously, and the rotation state of the wheel disc 21 can be detected by the sensing chip 242.

The electro-permanent magnet assembly 22 is located beside the wheel disc 21. The electro-permanent magnet assembly 22 can be selectively operated in a first operating status or a second operating status. When the electro-permanent magnet assembly 22 is operated in the first operating status, the electro-permanent magnet assembly 22 provides a first magnetic attraction force to the plural first extension structures 213 in the direction facing the first lateral disc part 212, and the electro-permanent magnet assembly 22 provides a second magnetic attraction force to the plural second extension structures 215 in the direction facing the second lateral disc part 214. When the electro-permanent magnet assembly 22 is operated in the second operating status, the electro-permanent magnet assembly 22 provides a third magnetic attraction force to the plural first extension structures 213 in the direction facing the first lateral disc part 212, and the electro-permanent magnet assembly 22 provides a fourth magnetic attraction force to the plural second extension structures 215 in the direction facing the second lateral disc part 214. The first magnetic attraction force is greater than the third magnetic attraction force. The second magnetic attraction force is greater than the fourth magnetic attraction force.

The electro-permanent magnet assembly 22 includes a first permanent magnet 221, a coil 222, a second permanent magnet 223, a third permanent magnet 224, a first magnetic conduction block 225, a second magnetic conduction block 226 and a bracket 227.

The first permanent magnet 221 has a first magnetic pole terminal 2211 and a second magnetic pole terminal 2212. The coil 222 is wound around the first permanent magnet 221. When a current flows through the coil 222, the operating status of the electro-permanent magnet assembly 22 is switched from the first operating status to the second operating status or switched from the second operating status back to the first operating status. The second permanent magnet 223 has a third magnetic pole terminal 2231 and a fourth magnetic pole terminal 2232. The third permanent magnet 224 has a fifth magnetic pole terminal 2241 and a sixth magnetic pole terminal 2242.

The first magnetic conduction block 225 is magnetically coupled with the first magnetic pole terminal 2211 of the first permanent magnet 221 and the third magnetic pole terminal 2231 of the second permanent magnet 223. The first magnetic conduction block 225 includes a first connecting part 2251 and a first clamping part 2252. The first connecting part 2351 is connected with the first magnetic pole terminal 2211 and the third magnetic pole terminal 2231. The first clamping part 2252 is extended from the first connecting part 2251 and extended in the direction toward the first lateral disc part 212. In addition, the first clamping part 2252 is located near at least one first extension structure 213 of the plural first extension structures 213. In this embodiment, the first clamping part 2252 includes plural first claws 22521, and the plural first claws 22521 are in a radial arrangement with the rotation axis line 211 as the center. As shown in FIG. 7, each first claw 22521 is aligned with a nearby first extension structure of the plural first extension structures 213. Especially, the plural first claws 22521 are spatially aligned with the corresponding number of first extension structures 213.

The second magnetic conduction block 226 is magnetically coupled with the second magnetic pole terminal 2212 of the first permanent magnet 221 and the sixth magnetic pole terminal 2242 of the third permanent magnet 224. The second magnetic conduction block 226 includes a second connecting part 2261 and a second clamping part 2262. The second connecting part 2261 is connected with the second magnetic pole terminal 2212 and the sixth magnetic pole terminal 2242. The second clamping part 2262 is extended from the second connecting part 2261 and extended in the direction toward the second lateral disc part 214. In addition, the second clamping part 2262 is located near at least one second extension structure 215 of the plural second first extension structures 215. In this embodiment, the second clamping part 2262 includes plural second claws 22621, and the second claws 22621 are in a radial arrangement with the rotation axis line 211 as the center. As shown in FIG. 7, each second claw 22621 is aligned with a nearby second extension structure 215 of the plural second extension structures 215. Especially, the plural second claws 22621 are spatially aligned with the corresponding number of second extension structures 215.

Furthermore, in the first embodiment, the roller module 2 is additionally equipped with a magnetic conduction sheet 228. The fourth magnetic pole terminal 2232 of the second permanent magnet 223 and the fifth magnetic pole terminal 2241 of the third permanent magnet 224 are magnetically coupled with each other through the magnetic conduction sheet 228. For example, the magnetic conduction sheet 228 is an iron sheet.

When the electro-permanent magnet assembly 22 is operated in the first operating status, the magnetic polarity of the first magnetic pole terminal 2211 of the first permanent magnet 221, the magnetic polarity of the third magnetic pole terminal 2231 of the second permanent magnet 223 and the magnetic polarity of the fifth magnetic pole terminal 2241 of the third permanent magnet 224 are identical. As shown in FIG. 9, the magnetic field lines 3 generated by the electro-permanent magnet assembly 22 are transmitted from the second magnetic conduction block 226 to the first magnetic conduction block 225 through the second extension structures 215, the wheel disc 21 and the first extension structures 213, or the magnetic field lines 3 are transmitted from first magnetic conduction block 225 to the second magnetic conduction block 226 through the first extension structures 213, the wheel disc 21 and the second extension structures 215. Under this circumstance, the electro-permanent magnet assembly 22 provides the first magnetic attraction force to the plural first extension structures 213 in the direction facing the first lateral disc part 212, and the electro-permanent magnet assembly 22 provides the second magnetic attraction force to the plural second extension structures 215 in the direction facing the second lateral disc part 214. If the wheel disc 21 is rotated when the electro-permanent magnet assembly 22 is operated in the first operating status, the first extension structures 213 are alternately close to and then away from the first magnetic conduction block 225, and the second extension structures 215 are alternately close to and then away from the second magnetic conduction block 226. During the rotation of the wheel disc 21, the wheel disc 21 receives the axial rotation resistance forces (or intermittent strong and weak magnetic attraction forces) from both sides. Consequently, a stepped rotation feel or an intermittent rotation feel is provided to the user's finger. Under this circumstance, the rotating wheel disc 21 is in the stepped rotation mode or the intermittent rotation mode.

As mentioned above, in the roller module 2, the electro-permanent magnet assembly 22 provides the axial rotation resistance forces to the wheel disc 21 from both sides. In addition, the size and arrangement relationships between the first magnetic conduction block 225 and the first extension structures 213 in the axial direction and the size and arrangement relationships between the second magnetic conduction block 226 and the second extension structures 215 in the axial direction are similar. In comparison with the radial rotation resistance forces, the electro-permanent magnet assembly 22 provides a stronger stepped rotation feel to the wheel disc 21 when the roller module 2 is operated in the stepped rotation mode. In case that the roller module is applied to a different target or the application target needs different degrees of stepped feedback in different models, the distance between the first magnetic conduction block 225 and the first extension structures 213 in the axial direction and the distance between the second magnetic conduction block 226 and the second extension structures 215 in the axial direction may be adjusted to achieve this purpose. Due to this structural design, the adjustment in the axial direction has the least impact on other components in the roller module 2 and is easier to achieve. For example, in case that the first magnetic conduction block 225 or the second magnetic conduction block 226 is replaced by another magnetic conductor with a different size, the distance between the first magnetic conduction block 225 and the first extension structures 213 in the axial direction or the distance between the second magnetic conduction block 226 and the second extension structures 215 in the axial direction can be adjusted. In this embodiment, the electro-permanent magnet assembly 22 provides the axial rotation resistance forces to the wheel disc 21 from both sides, and thus the wheel disc 21 is always maintained in the center position. Consequently, in response to a long-term force, the wheel disc 21 will not be deviated or moved to a certain side.

When the electro-permanent magnet assembly 22 is operated in the second operating status, the magnetic poles of the two magnetic pole terminals of the first permanent magnet 221 are exchanged. Consequently, the magnetic polarity of the second magnetic pole terminal 2212 of the first permanent magnet 221, the magnetic polarity of the third magnetic pole terminal 2231 of the second permanent magnet 223 and the magnetic polarity of the fifth magnetic pole terminal 2241 of the third permanent magnet 224 are identical. Similarly, the electro-permanent magnet assembly 22 provides the third magnetic attraction force to the plural first extension structures 213 in the direction facing the first lateral disc part 212, and the electro-permanent magnet assembly 22 provides the fourth magnetic attraction force to the plural second extension structures 215 in the direction facing the second lateral disc part 214. However, as shown in FIG. 10, most of the magnetic field lines 4 generated by the electro-permanent magnet assembly 22 will be circulated inside the electro-permanent magnet assembly 22. Consequently, the third magnetic attraction force is smaller than the first magnetic attraction force or approaches zero, and the fourth magnetic attraction force is smaller than the second magnetic attraction force or approaches zero. During the rotation of the wheel disc 21, the wheel disc 21 receives a tiny axial rotation resistance force only. In other words, the stepped rotation feel or the intermittent rotation feel provided to the user's finger is not obvious. Under this circumstance, the wheel disc 21 is in a non-stepped rotation mode or a smooth rotation mode. Whenever the wheel disc 21 is rotated, the wheel disc 21 can be continuously rotated for a certain time period before stopping.

The mechanism for switching the operating status of the electro-permanent magnet assembly 22 from the first operating status to the second operating status or switching the operating status of the electro-permanent magnet assembly 22 from the second operating status to the first operating status will be described in more details as follows. In accordance with a feature of the present invention, the magnetic pole distribution of the first permanent magnet 221 is changed when the direction of the current flowing through the coil 222 is changed. In addition, the direction of the current flowing through the coil 222 is opposed to the previous current direction after the operating mode is changed. Consequently, the magnetic pole distribution of the first permanent magnet 221 can be changed, and the operating status of the electro-permanent magnet assembly 22 can be alternately switched between the first operating status and the second operating status. In an embodiment, the first permanent magnet 221 is a magnet with low coercivity. The coil 222 is wound around the first permanent magnet 221. By changing the direction of the current flowing through the coil 222, the magnetic pole distribution of the first permanent magnet 221 will be changed.

In an embodiment, the mouse 1 is equipped with a switching key 15. After the switching key 15 is triggered, the operating status of the electro-permanent magnet assembly 22 is switched. In another embodiment, the operating status of the electro-permanent magnet assembly 22 is automatically switched according to the detection result of the rotation sensor 24. For example, if the rotation sensor 24 detects that the user rotates the wheel disc 21 quickly and continuously in a short period of time or the rotation sensor 24 detects that the rotation speed of the wheel disc 21 has reached a preset upper limit, the electro-permanent magnet assembly 22 of the roller module 2 will be switched from the first operating status to the second operating status. Whereas, if the above-mentioned behavior disappears or the above-mentioned condition is not satisfied, the electro-permanent magnet assembly 22 of the roller module 2 will be switched from the second operating status to the first operating status. Furthermore, the battery 14 in the mouse 1 can provide electric power for switching the operating status of the electro-permanent magnet assembly 22.

In an embodiment, the wheel disc 21 is rotated in the stepped rotation mode when the electro-permanent magnet assembly 22 is in the first operating status, and the current flows through the coil 222 in a first current direction 5 shown in FIG. 6 and FIG. 9 to drive the coil 222. Consequently, the first magnetic pole terminal 2211 of the first permanent magnet 221 is the S pole terminal, and the second magnetic pole terminal 2212 is the N pole terminal. Under this circumstance, the third magnetic pole terminal 2231 of the second permanent magnet 223 is the S pole terminal, the fourth magnetic pole terminal 2232 of the second permanent magnet 223 is the N pole terminal, the fifth magnetic pole terminal 2241 of the third permanent magnet 224 is the S pole terminal, and the sixth magnetic pole terminal 2242 is the N pole terminal. In addition, the wheel disc 21 is rotated in the non-stepped rotation mode when the electro-permanent magnet assembly 22 is in the second operating status, and the current flows through the coil 222 in a second current direction 6 shown in FIG. 6 and FIG. 10 to drive the coil 222. Consequently, the first magnetic pole terminal 2211 of the first permanent magnet 221 is the N pole terminal, and the second magnetic pole terminal 2212 is the S pole terminal. Under this circumstance, the third magnetic pole terminal 2231 of the second permanent magnet 223 is still the S pole terminal, the fourth magnetic pole terminal 2232 of the second permanent magnet 223 is still the N pole terminal, the fifth magnetic pole terminal 2241 of the third permanent magnet 224 is still the S pole terminal, and the sixth magnetic pole terminal 2242 is still the N pole terminal.

In another embodiment, the wheel disc 21 is rotated in the stepped rotation mode when the electro-permanent magnet assembly 22 is in the first operating status, and the magnetic pole distribution is modified. For example, the first magnetic pole terminal 2211 of the first permanent magnet 221 is the N pole terminal, the second magnetic pole terminal 2212 is the S pole terminal, the third magnetic pole terminal 2231 of the second permanent magnet 223 is the N pole terminal, the fourth magnetic pole terminal 2232 of the second permanent magnet 223 is the S pole terminal, the fifth magnetic pole terminal 2241 of the third permanent magnet 224 is the N pole terminal, and the sixth magnetic pole terminal 2242 is the S pole terminal. In addition, the wheel disc 21 is rotated in the non-stepped rotation mode when the electro-permanent magnet assembly 22 is in the second operating status, and the magnetic pole distribution is modified. For example, the first magnetic pole terminal 2211 of the first permanent magnet 221 is the S pole terminal, the second magnetic pole terminal 2212 is the N pole terminal, the third magnetic pole terminal 2231 of the second permanent magnet 223 is the N pole terminal, the fourth magnetic pole terminal 2232 of the second permanent magnet 223 is the S pole terminal, the fifth magnetic pole terminal 2241 of the third permanent magnet 224 is the N pole terminal, and the sixth magnetic pole terminal 2242 is the S pole terminal.

In the roller module 2, the bracket 227 is used for fixing the first permanent magnet 221, the coil 222, the second permanent magnet 223, the third permanent magnet 224, the first magnetic conduction block 225 and the second magnetic conduction block 226. The bracket 227 is fixed on the supporting base 23. Consequently, a fixed distance between the first magnetic conduction block 225 and the first extension structures 213 in the axial direction and a fixed distance between the second magnetic conduction block 226 and the second extension structures 215 in the axial direction can be maintained.

In an embodiment, the bracket 227 includes a central receiving structure 2271, a first locking recess 2272, a second locking recess 2273 and at least one positioning rod 2274. The at least one positioning rod 2274 is located under the central receiving structure 2271. The at least one positioning rod 2274 is aligned with the corresponding positioning hole 2341 in the carrier 234. After the at least one positioning rod 2274 is inserted into the corresponding positioning hole 2341, the bracket 227 is fixed on and assembled with the supporting base 23.

The first permanent magnet 221 is received within the central receiving structure 2271 of the bracket 227. The coil 222 is wound around the central receiving structure 2271 and arranged around the first permanent magnet 221. The first locking recess 2272 and the second locking recess 2273 are respectively located beside two opposite sides of the central receiving structure 2271. When the first magnetic conduction block 225 is installed in the first locking recess 2272, the first connecting part 2251 of the first magnetic conduction block 225 is engaged with the first locking recess 2272. When the second magnetic conduction block 226 is installed in the second locking recess 2273, the second connecting part 2261 of the second magnetic conduction block 226 is engaged with the second locking recess 2273.

Figure 11:
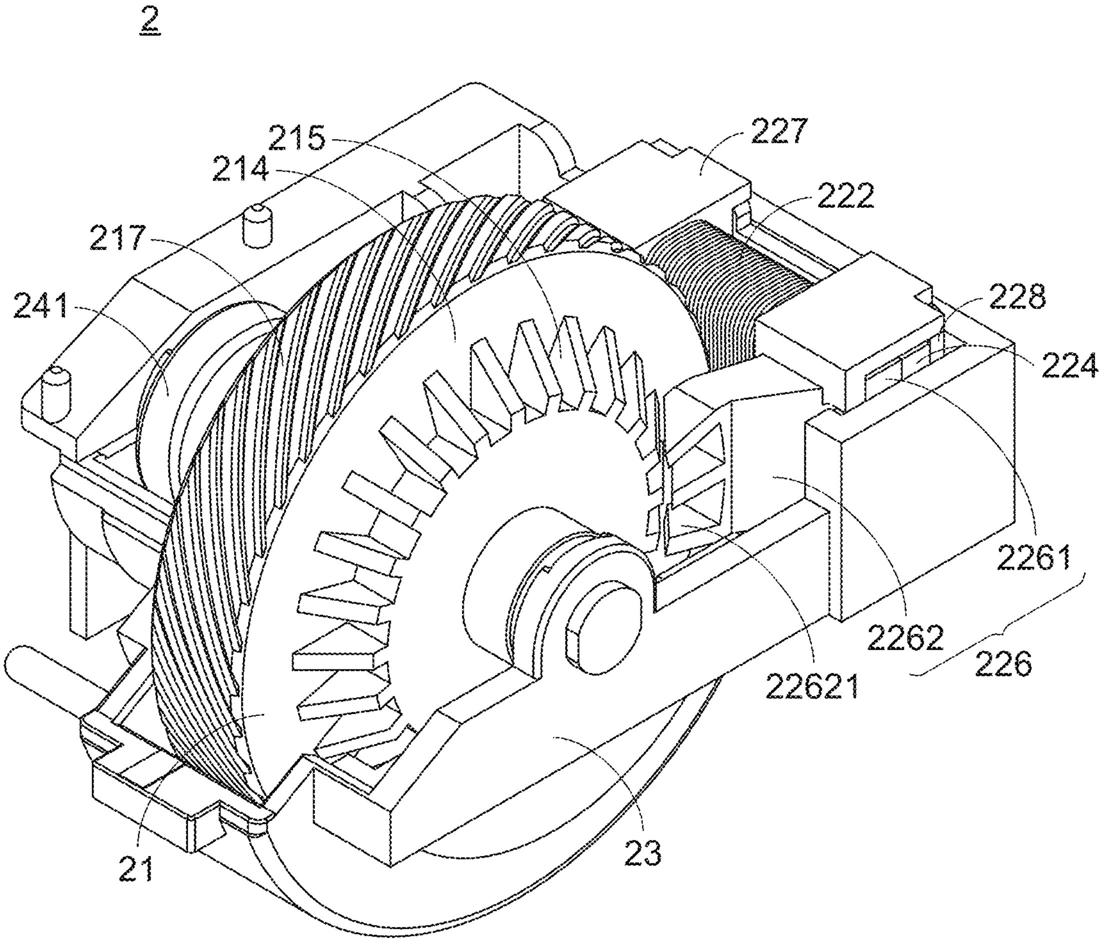
FIG. 11 is a schematic perspective view illustrating a roller module according to a second embodiment of the present invention.
Figure 12:
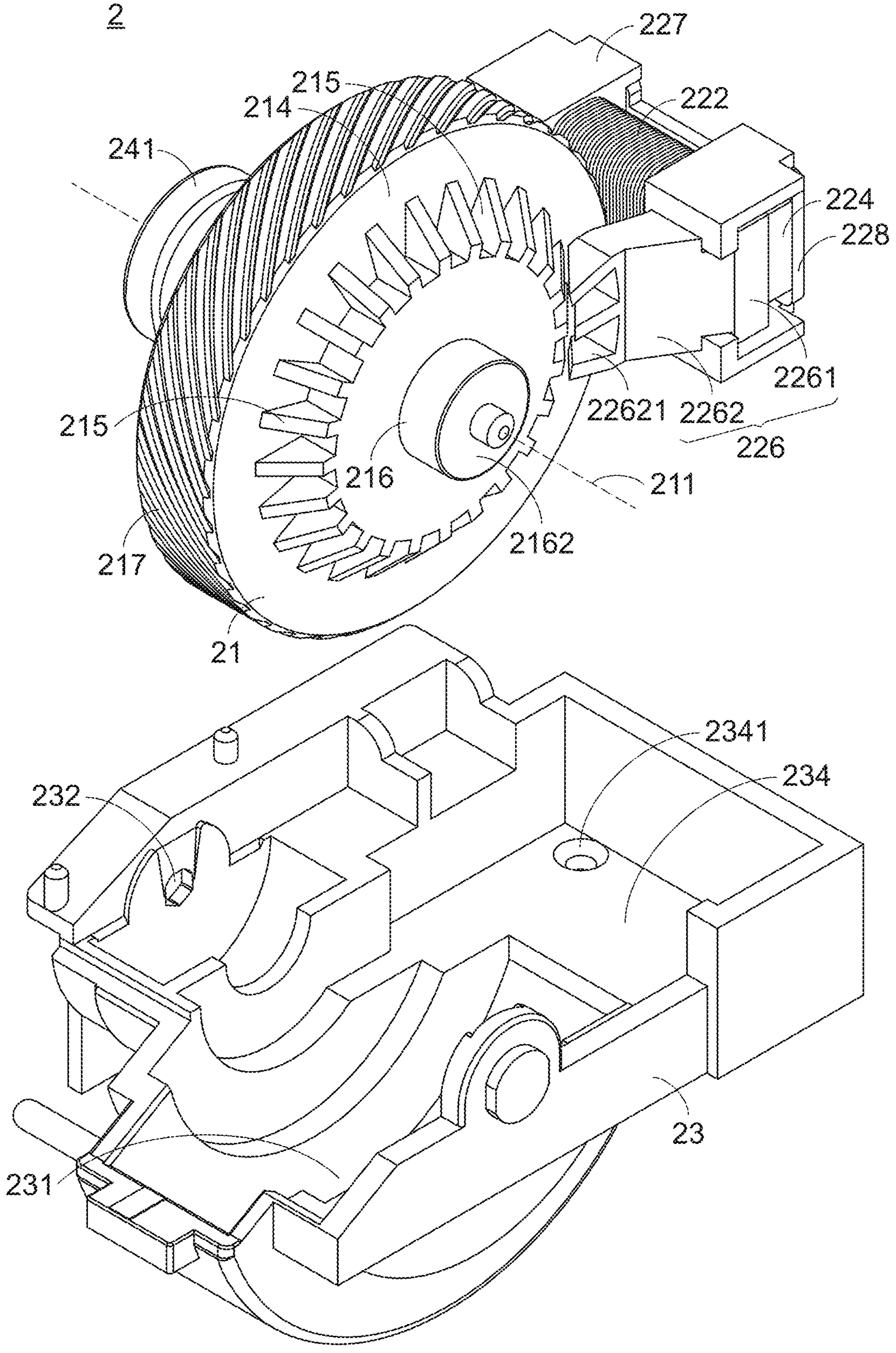
FIG. 12 is a schematic exploded view illustrating the roller module shown in FIG. 11.
Figure 13:
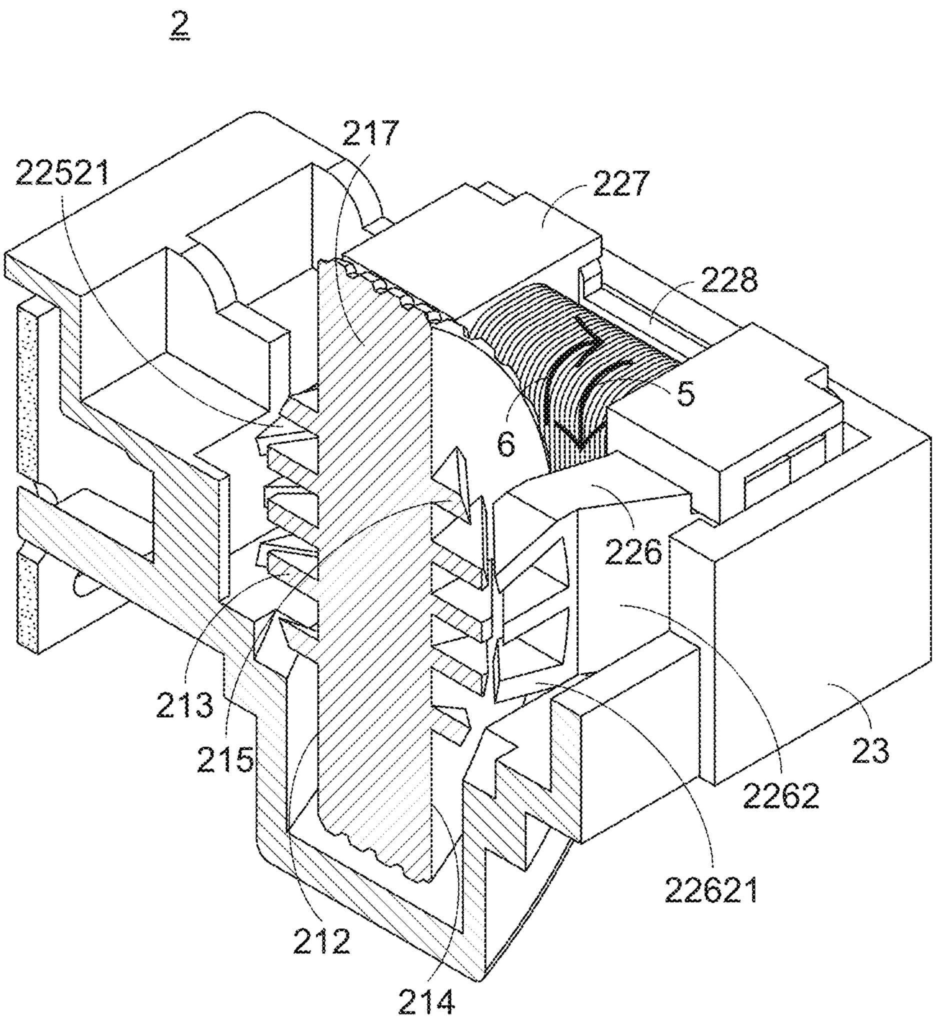
FIG. 13 is a schematic cutaway view illustrating the roller module shown in FIG. 11 and taken along a viewpoint.
Figure 14:
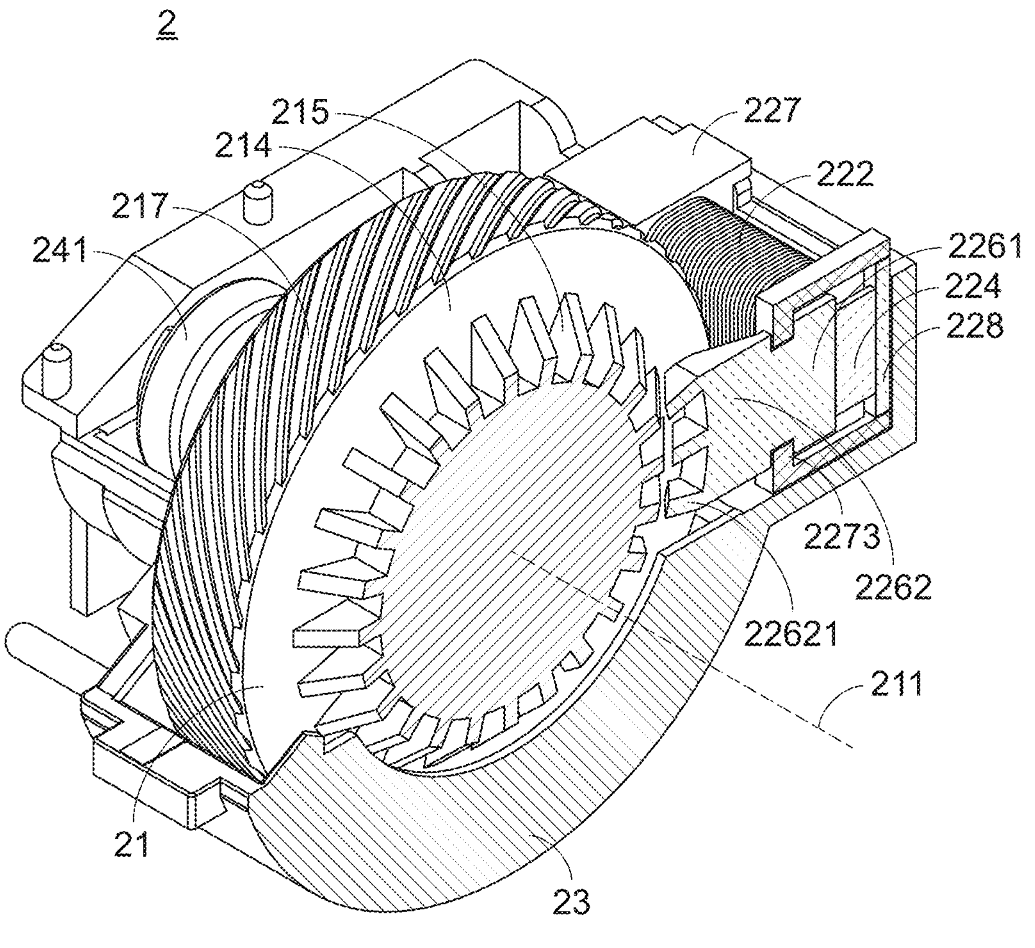
FIG. 14 is a schematic cutaway view illustrating the roller module shown in FIG. 11 and taken along another viewpoint.
Figure 15:
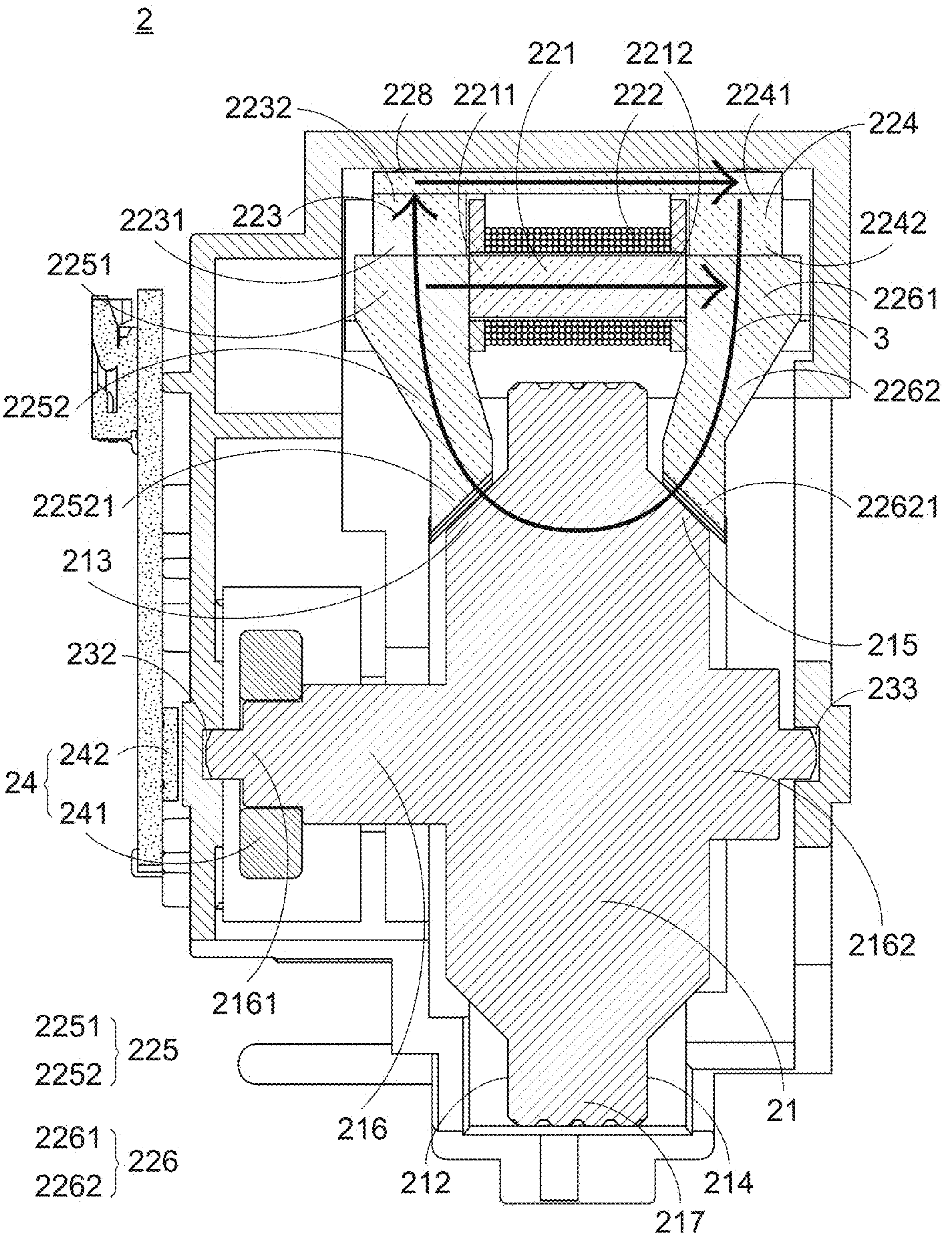
FIG. 15 is a schematic cross-sectional view illustrating the electro-permanent magnet assembly in the roller module shown in FIG. 11 and in a first operating status.
Figure 16:
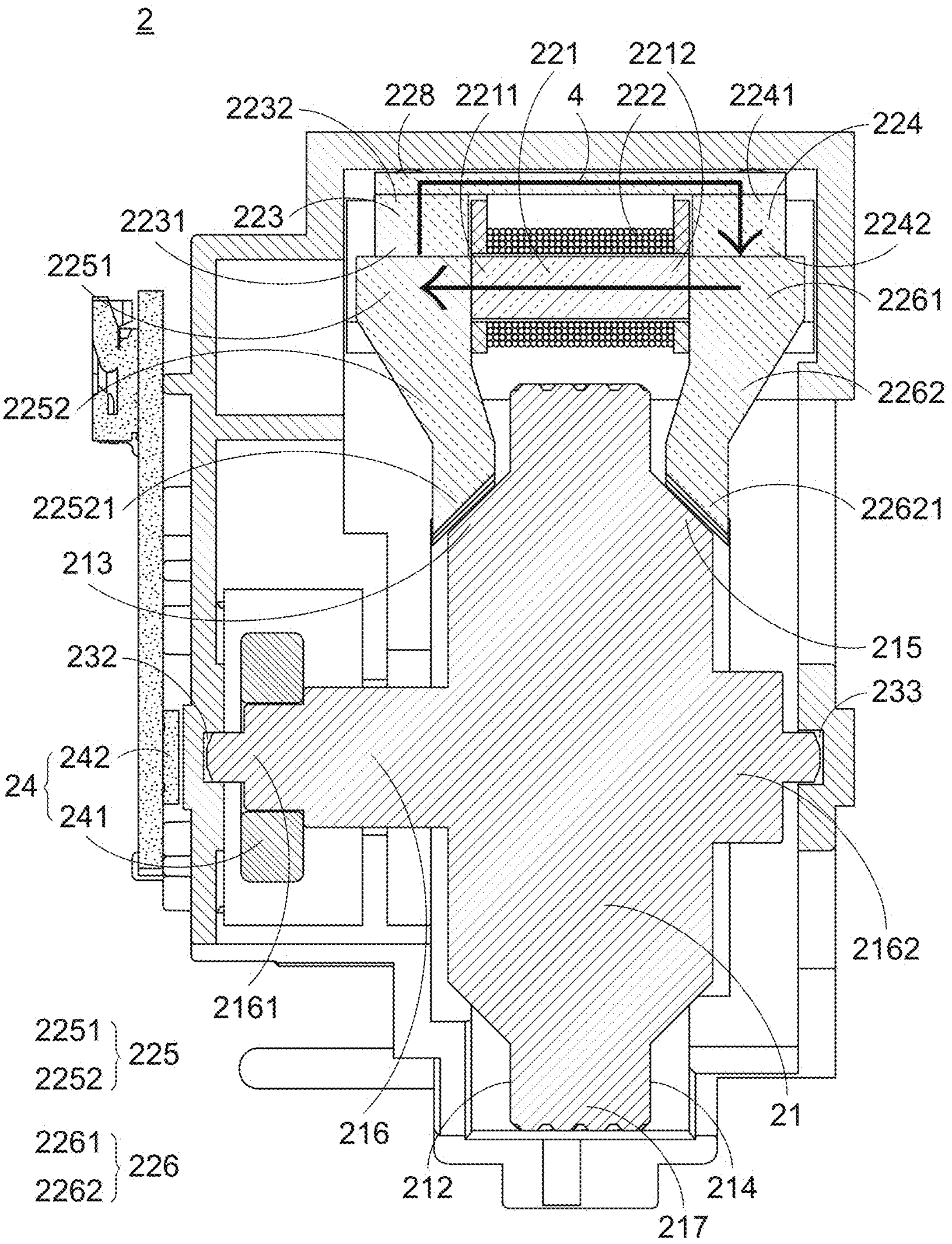
FIG. 16 is a schematic cross-sectional view illustrating the electro-permanent magnet assembly in the roller module shown in FIG. 11 and in a second operating status.

FIG. 11 is a schematic perspective view illustrating a roller module according to a second embodiment of the present invention. FIG. 12 is a schematic exploded view illustrating the roller module shown in FIG. 11. FIG. 13 is a schematic cutaway view illustrating the roller module shown in FIG. 11 and taken along a viewpoint. FIG. 14 is a schematic cutaway view illustrating the roller module shown in FIG. 11 and taken along another viewpoint. FIG. 15 is a schematic cross-sectional view illustrating the electro-permanent magnet assembly in the roller module shown in FIG. 11 and in a first operating status. FIG. 16 is a schematic cross-sectional view illustrating the electro-permanent magnet assembly in the roller module shown in FIG. 11 and in a second operating status.

An example of a roller module according to the second embodiment of the present invention will be described with reference to FIGS. 11 to 16. In comparison with the first embodiment, the first extension structures 213 and the second extension structures 215 on the two opposite sides of the wheel disc 21 in the roller module 2 of this embodiment are tapered structures. Especially, the first extension structures 213 are tapered in the direction away from the first lateral disc part 212 of the wheel disc 21, and the second extension structures 215 are tapered in the direction away from the second lateral disc part 214 of the wheel disc 21.

As mentioned above, the first extension structures 213 and the second extension structures 215 in the roller module 2 of this embodiment are tapered structures. Due to the tapered structures, some spaces are formed for allowing the first clamping part 2252 of the first magnetic conduction block 225 and the second clamping part 2262 of the second magnetic conduction block 226 to be deeply inserted therein. Consequently, the space between the first extension structures 213 and the first clamping part 2252 and the space between the second extension structures 215 and the second clamping part 2262 (especially the installation space in the axial direction) can be shortened. In this way, the purpose of reducing the overall volume of the roller module 2 can be achieved. The operations and the other components of the roller module 2 in the second embodiment are similar to those of the first embodiment, and not redundantly described herein.

The present further provides a roller module 2 according to a third embodiment of the present invention. In comparison with the first and second embodiments, only a single lateral disc part of the wheel disc 21 of the roller module 2 is equipped with the extension structures. The other components of the roller module 2 of the third embodiment are similar to those of the first embodiment or the second embodiment, and not redundantly described herein.

Figure 17:
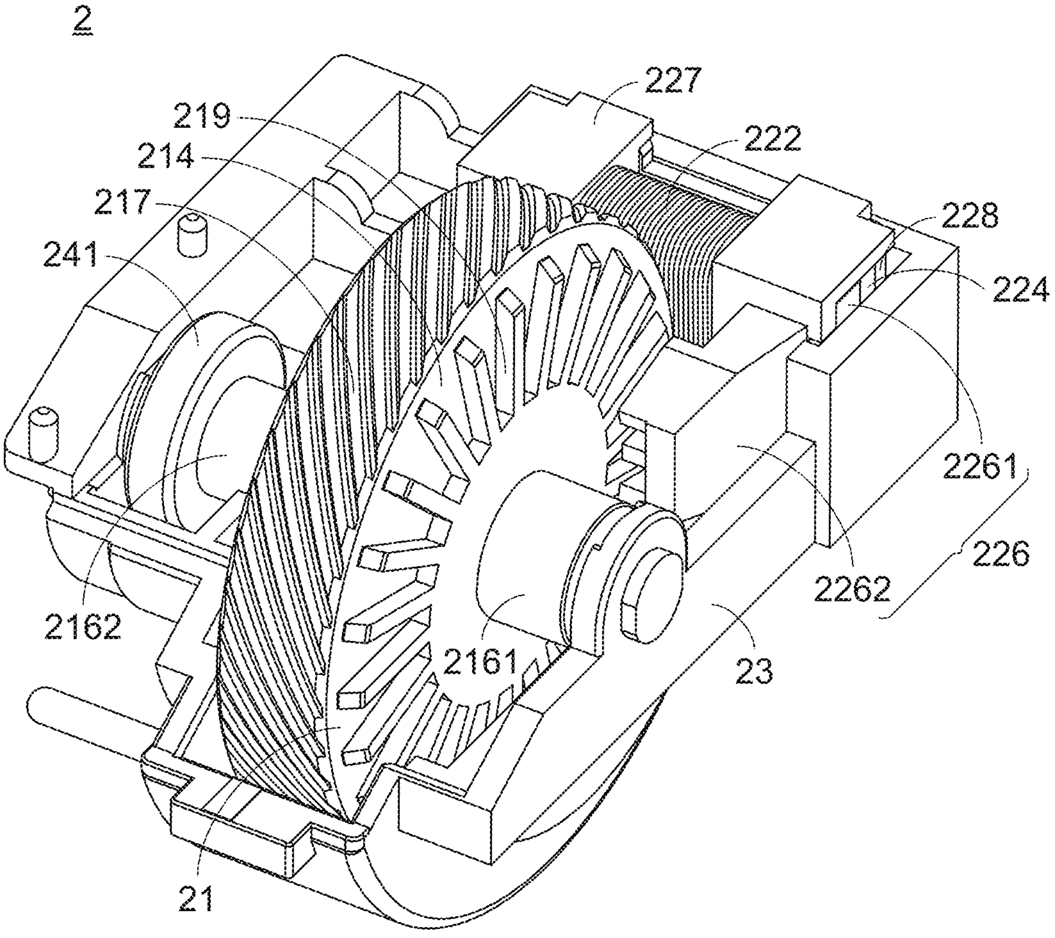
FIG. 17 is a schematic perspective view illustrating a roller module according to a third embodiment of the present invention.
Figure 18:
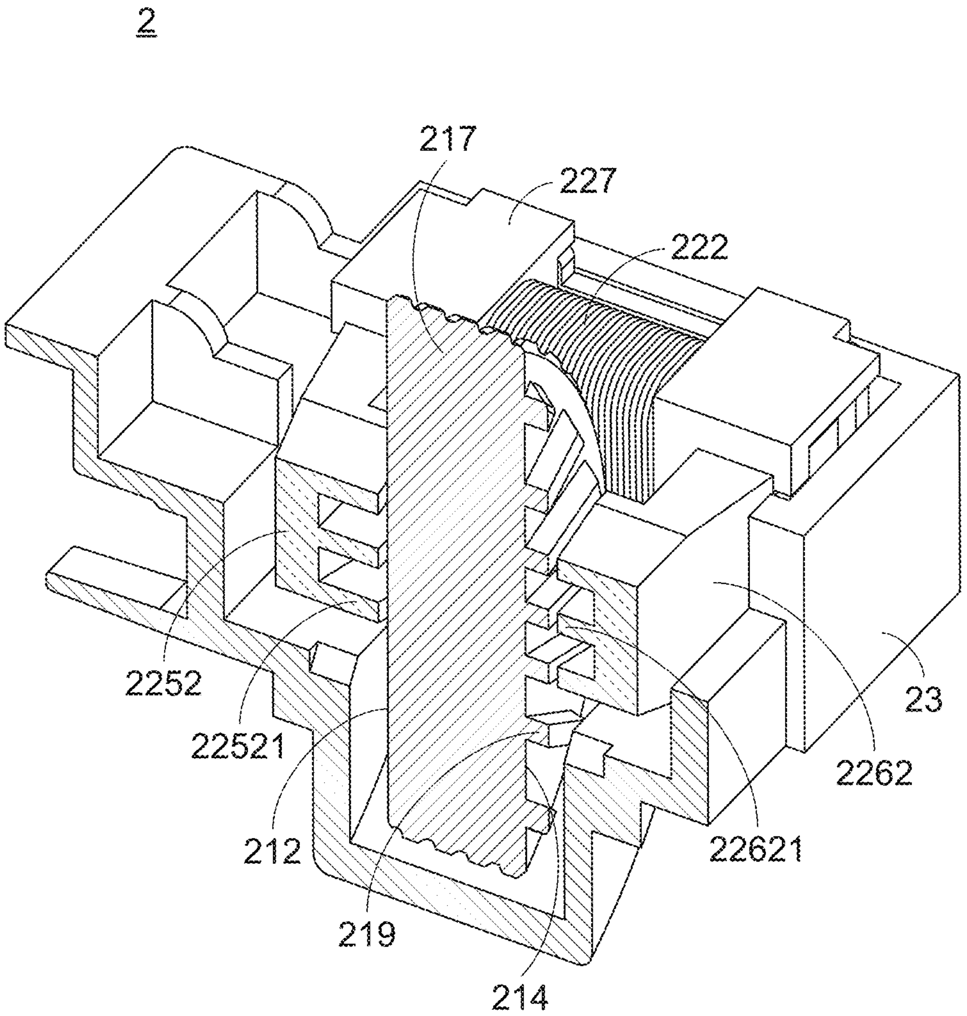
FIG. 18 is a schematic cutaway view illustrating the roller module shown in FIG. 17 and taken along a viewpoint.
Figure 19:
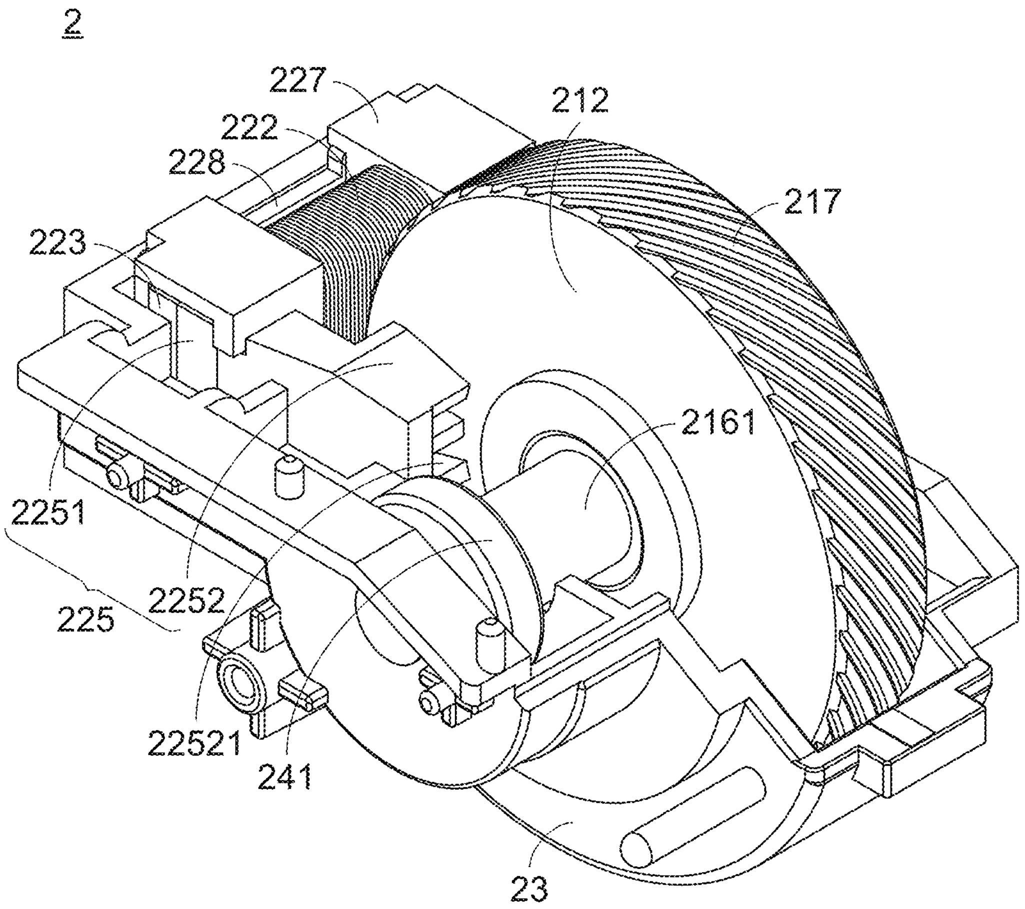
FIG. 19 is a schematic cutaway view illustrating the roller module shown in FIG. 17 and taken along another viewpoint.
Figure 20:
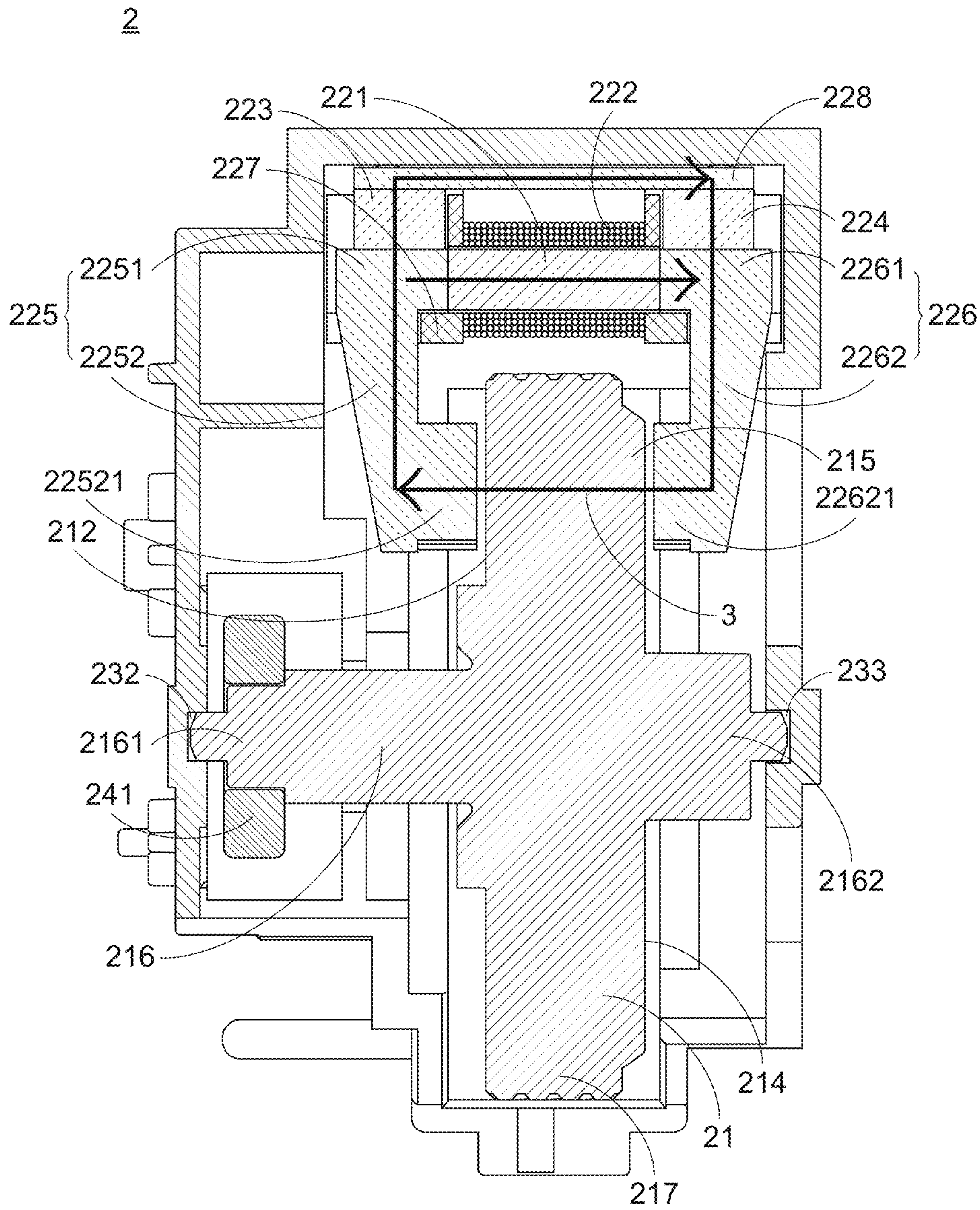
FIG. 20 is a schematic cross-sectional view illustrating the electro-permanent magnet assembly in the roller module shown in FIG. 17 and in a first operating status.
Figure 21:
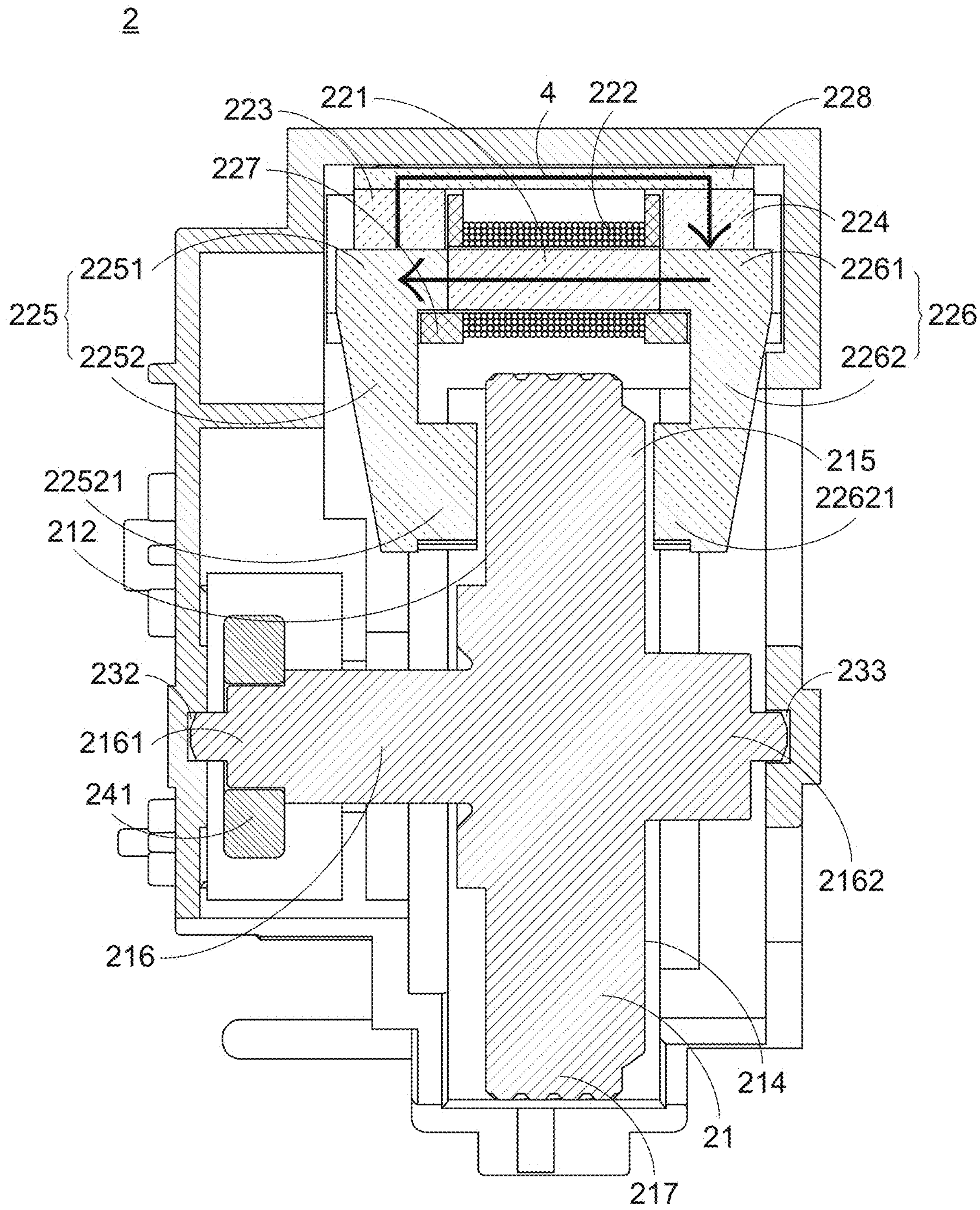
FIG. 21 is a schematic cross-sectional view illustrating the electro-permanent magnet assembly in the roller module shown in FIG. 17 and in a second operating status.

FIG. 17 is a schematic perspective view illustrating a roller module according to a third embodiment of the present invention. FIG. 18 is a schematic cutaway view illustrating the roller module shown in FIG. 17 and taken along a viewpoint. FIG. 19 is a schematic cutaway view illustrating the roller module shown in FIG. 17 and taken along another viewpoint. FIG. 20 is a schematic cross-sectional view illustrating the electro-permanent magnet assembly in the roller module shown in FIG. 17 and in a first operating status. FIG. 21 is a schematic cross-sectional view illustrating the electro-permanent magnet assembly in the roller module shown in FIG. 17 and in a second operating status.

An example of a roller module according to the third embodiment of the present invention will be described with reference to FIGS. 17 to 21. The wheel disc 21 includes a first lateral disc part 212, a second lateral disc part 214 and plural extension structures 219. The plural extension structures 219 are externally protruded from the second lateral disc part 214. In addition, the plural extension structures 219 are in a radial arrangement with the rotation axis line 211 as the center. In this embodiment, the first lateral disc part 212 is not equipped with extension structures.

Similarly, the first magnetic conduction block 225 of the electro-permanent magnet assembly 22 includes a first connecting part 2251 and a first clamping part 2252. The first connecting part 2351 is connected with the first magnetic pole terminal 2211 and the third magnetic pole terminal 2231. The first clamping part 2252 is extended from the first connecting part 2251 and extended in the direction toward the first lateral disc part 212. In addition, the first clamping part 2252 is located near the first lateral disc part 212. Similarly, the second magnetic conduction block 226 includes a second connecting part 2261 and a second clamping part 2262. The second connecting part 2261 is connected with the second magnetic pole terminal 2212 and the sixth magnetic pole terminal 2242. The second clamping part 2262 is extended from the second connecting part 2261 and extended in the direction toward the second lateral disc part 214. In addition, the second clamping part 2262 is located beside at least one extension structure 219 of the plural extension structures 219.

The electro-permanent magnet assembly 22 can be selectively operated in a first operating status or a second operating status. Please refer to FIG. 20. When the electro-permanent magnet assembly 22 is operated in the first operating status, the magnetic field lines 3 generated by the electro-permanent magnet assembly 22 are transmitted to the extension structures 219 of the wheel disc 21 through the second magnetic conduction block 226, or the magnetic field lines 3 are transmitted to the wheel disc 21 through the first magnetic conduction block 225. Under this circumstance, the electro-permanent magnet assembly 22 provides a first magnetic attraction force to the first lateral disc part 212 of the wheel disc 21 in the direction facing the first lateral disc part 212, and the electro-permanent magnet assembly 22 provides a second magnetic attraction force to at least one extension structure 219 of the plural extension structures 219 in the direction facing the second lateral disc part 214.

When the electro-permanent magnet assembly 22 is operated in the second operating status, the magnetic poles of the two magnetic pole terminals of the first permanent magnet 221 will be exchanged. Under this circumstance, the electro-permanent magnet assembly 22 provides a third magnetic attraction force to the first lateral disc part 212 of the wheel disc 21 in the direction facing the first lateral disc part 212, and the electro-permanent magnet assembly 22 provides a fourth magnetic attraction force to the at least one extension structure 219 of the plural extension structures 219 in the direction facing the second lateral disc part 214. However, as shown in FIG. 21, most of the magnetic field lines 4 generated by the electro-permanent magnet assembly 22 will be circulated inside the electro-permanent magnet assembly 22. Consequently, the third magnetic attraction force is smaller than the first magnetic attraction force or approaches zero, and the fourth magnetic attraction force is smaller than the second magnetic attraction force or approaches zero.

In a variant example of the roller module 2 of the third embodiment, the extension structures 219 are tapered structures similar to those of the second embodiment. Especially, the extension structures 219 are tapered in the direction away from the second lateral disc part 214 of the wheel disc 21. Consequently, the space for installing the roller module 2 can be reduced.

In another variant example of the roller module 2 of the third embodiment, the first lateral disc part 212 is equipped with extension structures, but the second lateral disc part 214 is not equipped with extension structures.

The present further provides a roller module 2 according to a fourth embodiment of the present invention. In comparison with the above embodiments, the structure of the wheel disc 21 of the roller module 2 in this embodiment is distinguished. The other components of the roller module 2 of the fourth embodiment are similar to those of the first embodiment, the second embodiment or the third embodiment, and not redundantly described herein.

Figure 22:
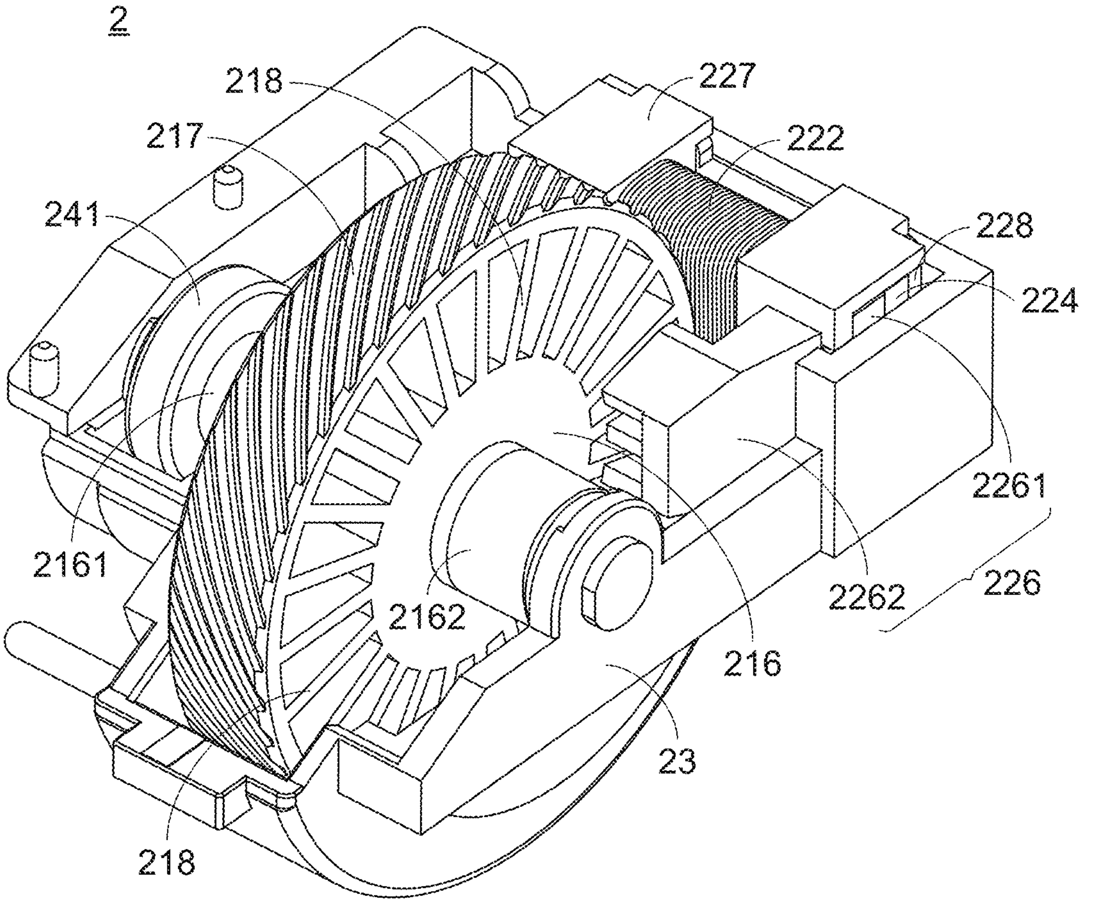
FIG. 22 is a schematic perspective view illustrating a roller module according to a fourth embodiment of the present invention.
Figure 23:
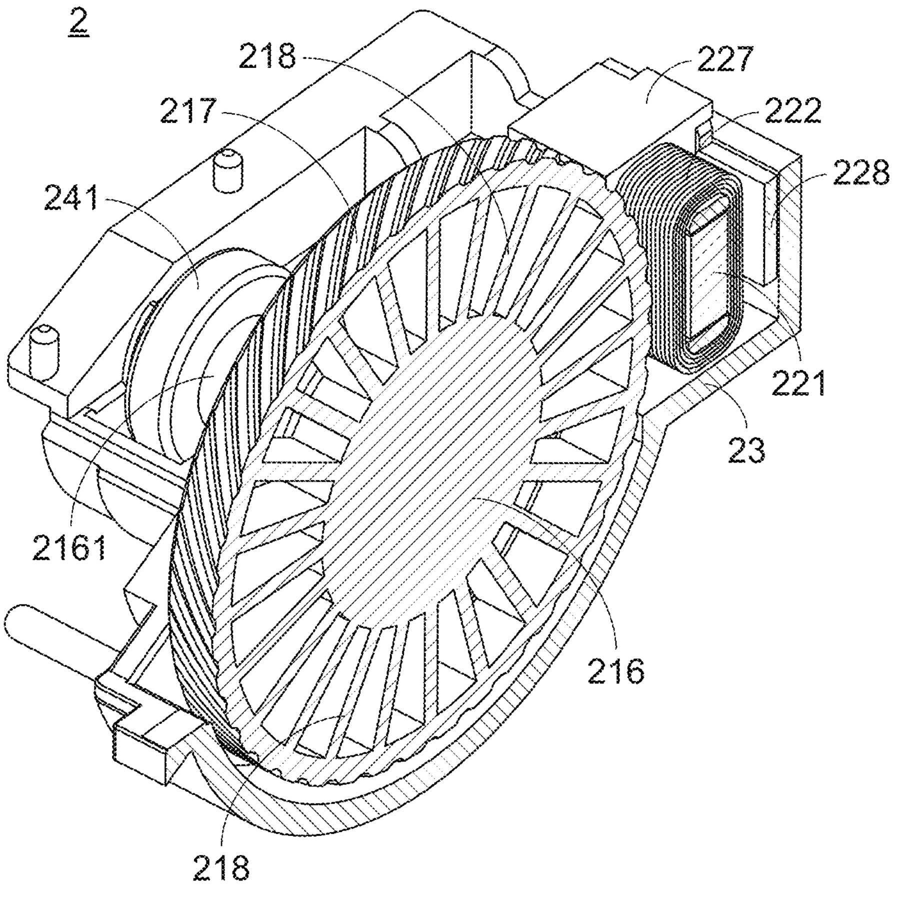
FIG. 23 is a schematic cutaway view illustrating the roller module shown in FIG. 22 and taken along a viewpoint.
Figure 24:
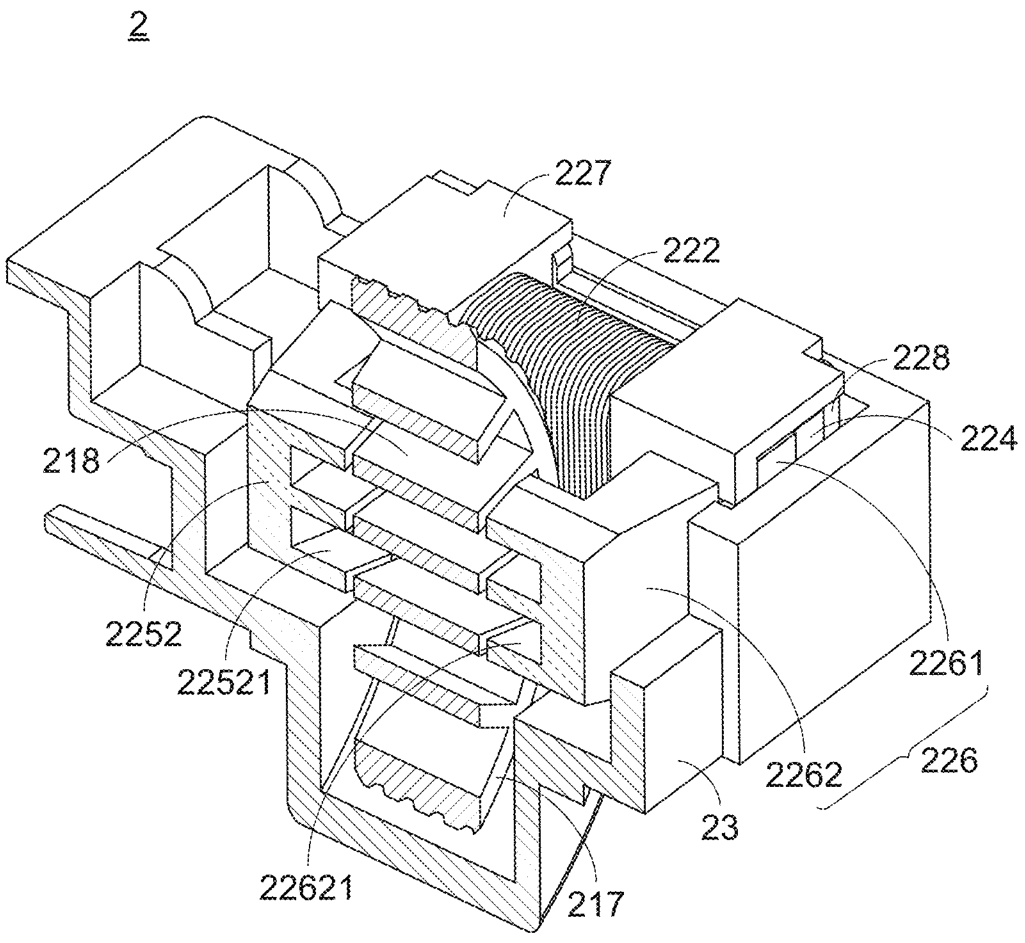
FIG. 24 is a schematic cutaway view illustrating the roller module shown in FIG. 22 and taken along another viewpoint.
Figure 25:
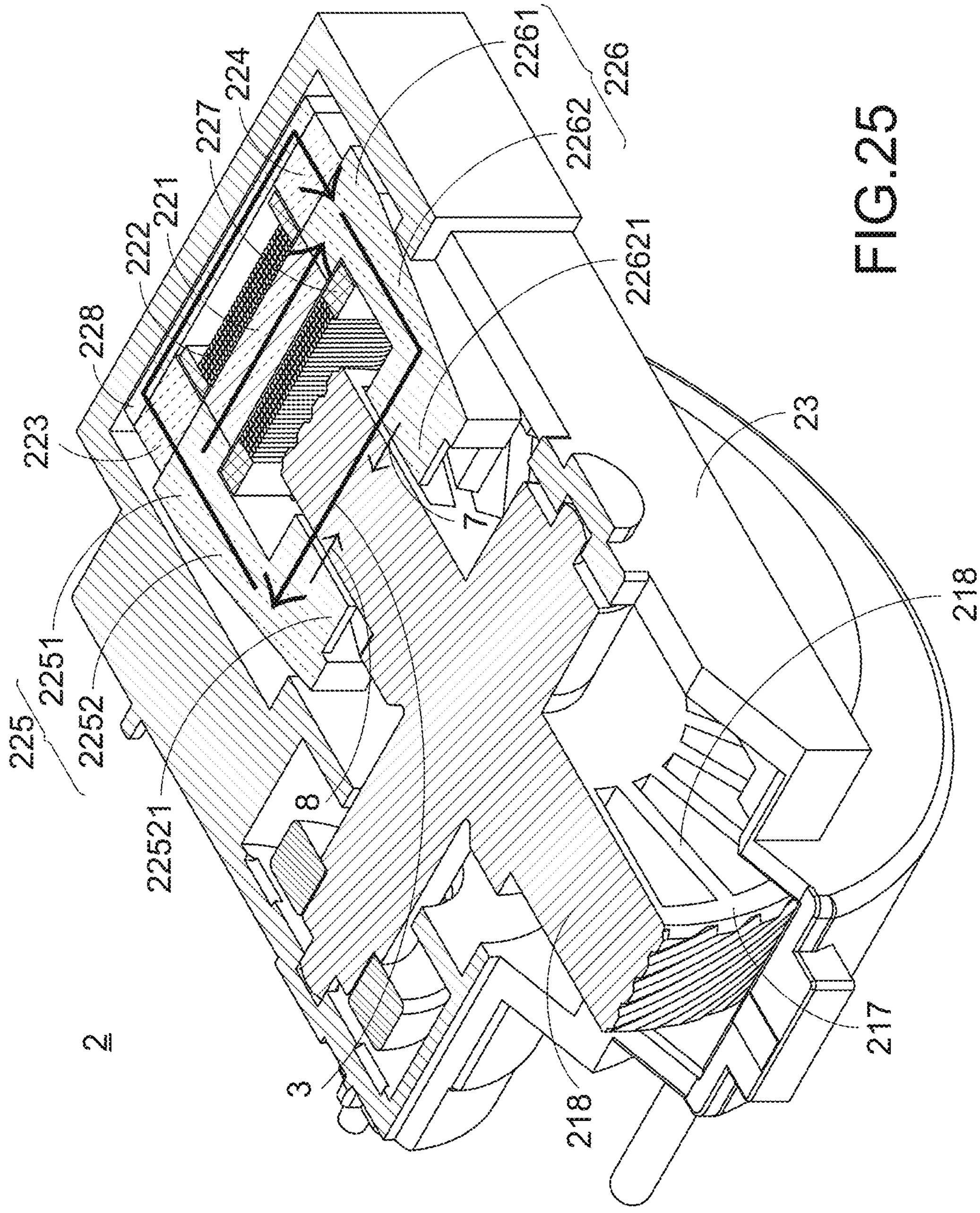
FIG. 25 is a schematic cross-sectional view illustrating the electro-permanent magnet assembly in the roller module shown in FIG. 22 and in a first operating status.
Figure 26:
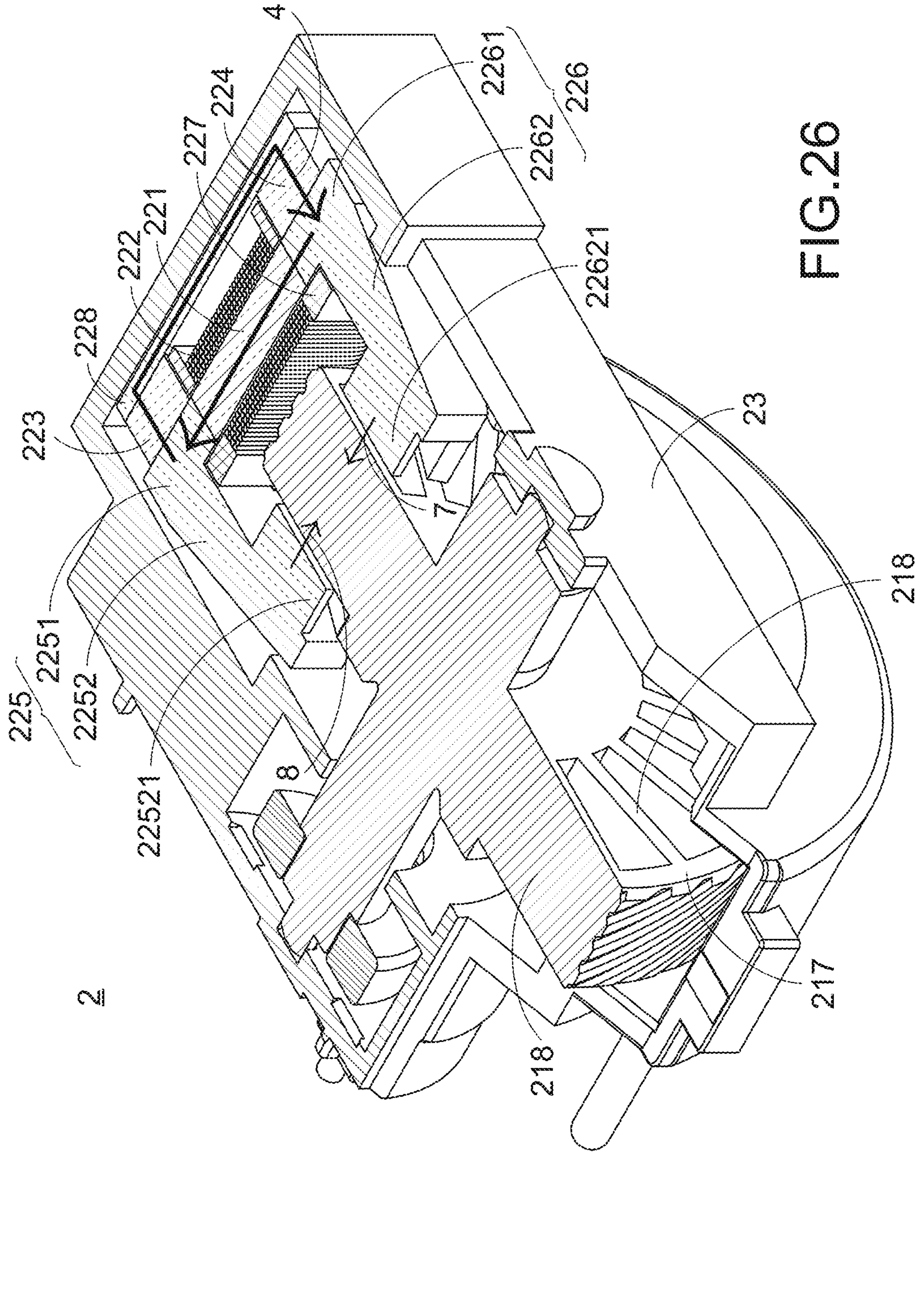
FIG. 26 is a schematic cross-sectional view illustrating the electro-permanent magnet assembly in the roller module shown in FIG. 22 and in a second operating status.

FIG. 22 is a schematic perspective view illustrating a roller module according to a fourth embodiment of the present invention. FIG. 23 is a schematic cutaway view illustrating the roller module shown in FIG. 22 and taken along a viewpoint. FIG. 24 is a schematic cutaway view illustrating the roller module shown in FIG. 22 and taken along another viewpoint. FIG. 25 is a schematic cross-sectional view illustrating the electro-permanent magnet assembly in the roller module shown in FIG. 22 and in a first operating status. FIG. 26 is a schematic cross-sectional view illustrating the electro-permanent magnet assembly in the roller module shown in FIG. 22 and in a second operating status.

An example of a roller module according to the fourth embodiment of the present invention will be described with reference to FIGS. 22 to 26. The wheel disc 21 of the roller module 2 also has magnetic conductivity. The wheel disc 21 can be rotated along a rotation axis line 211. The wheel disc 21 includes a pivotal part 216, and an outer disc part 217 and plural wheel spokes 218. The plural wheel spokes 218 are arranged between the pivotal part 216 and the outer disc part 217. In addition, the plural wheel spokes 218 are radially extended from the pivotal part 216 and in a radial arrangement.

In this embodiment, the first magnetic conduction block 225 of the electro-permanent magnet assembly 22 includes a first connecting part 2251 and a first clamping part 2252. The first connecting part 2351 is connected with the first magnetic pole terminal 2211 and the third magnetic pole terminal 2231. The first clamping part 2252 is located beside at least one wheel spoke 218 of the plural wheel spokes 218. Similarly, the second magnetic conduction block 226 of the electro-permanent magnet assembly 22 includes a second connecting part 2261 and a second clamping part 2262. The second connecting part 2261 is connected with the second magnetic pole terminal 2212 and the sixth magnetic pole terminal 2242. The second clamping part 2262 is located beside at least one wheel spoke 218 of the plural wheel spokes 218.

Similarly, the first clamping part 2252 includes plural first claws 22521, and each first claw 22521 is aligned with a nearby wheel spoke 218 of the plural wheel spokes 218. Similarly, the second clamping part 2262 includes plural second claws 22621, and each second claw 22621 is aligned with a nearby wheel spoke 218 of the plural wheel spokes 218.

The electro-permanent magnet assembly 22 can be selectively operated in a first operating status or a second operating status. Please refer to FIG. 25. When the electro-permanent magnet assembly 22 is operated in the first operating status, the magnetic field lines 3 generated by the electro-permanent magnet assembly 22 are transmitted to at least one wheel spoke 218 of the plural wheel spokes 218 through the first magnetic conduction block 225 or transmitted to at least one wheel spoke 218 of the plural wheel spokes 218 through the second magnetic conduction block 226. Under this circumstance, the electro-permanent magnet assembly 22 provides a first magnetic attraction force to at least one wheel spoke 218 of the plural wheel spokes 218 in a first direction 7 parallel with the rotation axis line 211, and the electro-permanent magnet assembly 22 provides a second magnetic attraction force to at least one wheel spoke 218 of the plural wheel spokes 218 in a second direction 8 parallel with the rotation axis line 211. The first direction 7 and the second direction 8 are opposed to each other.

When the electro-permanent magnet assembly 22 is operated in the second operating status, the magnetic poles of the two magnetic pole terminals of the first permanent magnet 221 will be exchanged. Under this circumstance, the electro-permanent magnet assembly 22 provides a third magnetic attraction force to at least one wheel spoke 218 of the plural wheel spokes 218 in the first direction 7, and the electro-permanent magnet assembly 22 provides a fourth magnetic attraction force to the to at least one wheel spoke 218 of the plural wheel spokes 218 in the second direction 8. However, as shown in FIG. 26, most of the magnetic field lines 4 generated by the electro-permanent magnet assembly 22 will be circulated inside the electro-permanent magnet assembly 22. Consequently, the third magnetic attraction force is smaller than the first magnetic attraction force or approaches zero, and the fourth magnetic attraction force is smaller than the second magnetic attraction force or approaches zero.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A roller module, comprising:

a wheel disc having magnetic conductivity, rotatable along a rotation axis line, and comprising a first lateral disc part, plural first extension structures, a second lateral disc part and plural second extension structures, wherein the first lateral disc part and the second lateral disc part are opposed to each other, the plural first extension structures are externally protruded from the first lateral disc part, the plural first extension structures are in a radial arrangement with the rotation axis line as a center, the plural second extension structures are externally protruded from the second lateral disc part, and the plural second extension structures are in the radial arrangement with the rotation axis line as the center; and an electro-permanent magnet assembly selectively operated in a first operating status or a second operating status, wherein the electro-permanent magnet assembly comprises;

a first permanent magnet having a first magnetic pole terminal and a second magnetic pole terminal;

a coil wound around the first permanent magnet;

a second permanent magnet having a third magnetic pole terminal and a fourth magnetic pole terminal;

a third permanent magnet having a fifth magnetic pole terminal and a sixth magnetic pole terminal:

a first magnetic conduction block magnetically coupled with the first magnetic pole terminal and the third magnetic pole terminal; and a second magnetic conduction block magnetically coupled with the second magnetic pole terminal and the sixth magnetic pole terminal, wherein when the electro-permanent magnet assembly is operated in the first operating status, the electro-permanent magnet assembly provides a first magnetic attraction force to at least one first extension structure of the plural first extension structures in a direction facing the first lateral disc part, and the electro-permanent magnet assembly provides a second magnetic attraction force to at least one second extension structure of the plural second extension structures in a direction facing the second lateral disc part, wherein when the electro-permanent magnet assembly is operated in the second operating status, the electro-permanent magnet assembly provides a third magnetic attraction force to at least one first extension structure of the plural first extension structures in the direction facing the first lateral disc part, and the electro-permanent magnet assembly provides a fourth magnetic attraction force to at least one second extension structure of the plural second extension structures in the direction facing the second lateral disc part, wherein the first magnetic attraction force is greater than the third magnetic attraction force, and the second magnetic attraction force is greater than the fourth magnetic attraction force.

2. The roller module according to claim 1, wherein the first magnetic conduction block comprises a first connecting part and a first clamping part, and the second magnetic conduction block comprises a second connecting part and a second clamping part, wherein the first connecting part is connected with the first magnetic pole terminal and the third magnetic pole terminal, the first clamping part is extended from the first connecting part and extended in a direction toward the first lateral disc part, and the first clamping part is located near at least one first extension structure of the plural first extension structures, wherein the second connecting part is connected with the second magnetic pole terminal and the sixth magnetic pole terminal, the second clamping part is extended from the second connecting part and extended in a direction toward the second lateral disc part, and the second clamping part is located near at least one second extension structure of the plural second extension structures.

3. The roller module according to claim 2, wherein the first clamping part includes plural first claws, and each of the plural first claws is located near the corresponding first extension structure of the plural first extension structures, wherein the second clamping part includes plural second claws, and each of the plural second claws is located near the corresponding second extension structure of the plural second extension structures.

4. The roller module according to claim 3, wherein the plural first claws are in the radial arrangement with the rotation axis line as the center, and the plural second claws are in the radial arrangement with the rotation axis line as the center.

5. The roller module according to claim 1, wherein when the electro- permanent magnet assembly is operated in the first operating status, a magnetic polarity of the first magnetic pole terminal, a magnetic polarity of the third magnetic pole terminal and a magnetic polarity of the fifth magnetic pole terminal are identical, wherein when the electro- permanent magnet assembly is operated in the second operating status, a magnetic polarity of the second magnetic pole terminal, the magnetic polarity of the third magnetic pole terminal and the magnetic polarity of the fifth magnetic pole terminal are identical.

6. The roller module according to claim 5, wherein when the electro-permanent magnet assembly is operated in the first operating status, the first magnetic pole terminal is an S pole terminal, the second magnetic pole terminal is an N pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal, wherein when the electro-permanent magnet assembly is operated in the second operating status, the first magnetic pole terminal is the N pole terminal, the second magnetic pole terminal is the S pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal.

7. The roller module according to claim 5, wherein when the electro-permanent magnet assembly is operated in the first operating status, the first magnetic pole terminal is an N pole terminal, the second magnetic pole terminal is an S pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal, wherein when the electro-permanent magnet assembly is operated in the second operating status, the first magnetic pole terminal is the S pole terminal, the second magnetic pole terminal is the N pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal.

8. The roller module according to claim 5, wherein when a current flows through the coil, an operating status of the electro-permanent magnet assembly is switched from the first operating status to the second operating status.

9. The roller module according to claim 1, wherein the roller module further comprises a magnetic conduction sheet, and the fourth magnetic pole terminal and the fifth magnetic pole terminal are magnetically coupled with each other through the magnetic conduction sheet.

10. The roller module according to claim 1, wherein the wheel disc further comprises a pivotal part and an outer disc part, and the outer disc part is arranged between the first lateral disc part and the second lateral disc part.

11. The roller module according to claim 10, wherein the roller module further comprises a supporting base, and the supporting base comprises an accommodation recess, a first pivotal hole and a second pivotal hole, wherein the wheel disc is pivotally coupled to the supporting base through the pivotal part, a portion of the wheel disc is received within the accommodation recess, and the first pivotal hole and the second pivotal hole are respectively located beside two opposite sides of the accommodation recess.

12. The roller module according to claim 11, wherein the pivotal part comprises a first rotation shaft and a second rotation shaft, wherein the first rotation shaft is externally protruded from the first lateral disc part of the wheel disc, the second rotation shaft is externally protruded from the second lateral disc part of the wheel disc, a distal end of the first rotation shaft is inserted into the first pivotal hole, and a distal end of the second rotation shaft is inserted into the second pivotal hole.

13. The roller module according to claim 12, wherein the roller module further comprises a rotation sensor, and the rotation sensor comprises a magnetic turntable and a sensing chip, wherein a rotation state of the wheel disc is detected by the sensing chip, and the magnetic turntable is sheathed around the first rotation shaft and synchronously rotated with the magnetic turntable.

14. The roller module according to claim 1, wherein the first extension structures and the second extension structures are tapered structures, wherein the first extension structures are tapered in a direction away from the first lateral disc part of the wheel disc, and the second extension structures are tapered in a direction away from the second lateral disc part of the wheel disc.

15. A roller module, comprising:

a wheel disc having magnetic conductivity, rotatable along a rotation axis line, and comprising a first lateral disc part, plural extension structures and a second lateral disc part, wherein the first lateral disc part and the second lateral disc part are opposed to each other, the plural extension structures are externally protruded from the second lateral disc part, and the plural extension structures are in a radial arrangement with the rotation axis line as a center;

an electro-permanent magnet assembly selectively operated in a first operating status or a second operating status, wherein when the electro-permanent magnet assembly is operated in the first operating status, the electro-permanent magnet assembly provides a first magnetic attraction force to the wheel disc in a direction facing the first lateral disc part, and the electro-permanent magnet assembly provides a second magnetic attraction force to at least one extension structure of the plural extension structures in a direction facing the second lateral disc part, wherein when the electro-permanent magnet assembly is operated in the second operating status, the electro-permanent magnet assembly provides a third magnetic attraction force to the wheel disc in the direction facing the first lateral disc part, and the electro-permanent magnet assembly provides a fourth magnetic attraction force to at least one extension structure of the plural extension structures in the direction facing the second lateral disc part, wherein the first magnetic attraction force is greater than the third magnetic attraction force, and the second magnetic attraction force is greater than the fourth magnetic attraction force.

16. The roller module according to claim 15, wherein the electro-permanent magnet assembly comprises:

a first permanent magnet having a first magnetic pole terminal and a second magnetic pole terminal;

a coil wound around the first permanent magnet;

a second permanent magnet having a third magnetic pole terminal and a fourth magnetic pole terminal;

a third permanent magnet having a fifth magnetic pole terminal and a sixth magnetic pole terminal;

a first magnetic conduction block magnetically coupled with the first magnetic pole terminal and the third magnetic pole terminal; and a second magnetic conduction block magnetically coupled with the second magnetic pole terminal and the sixth magnetic pole terminal.

17. The roller module according to claim 16, wherein the first magnetic conduction block comprises a first connecting part and a first clamping part, and the second magnetic conduction block comprises a second connecting part and a second clamping part, wherein the first connecting part is connected with the first magnetic pole terminal and the third magnetic pole terminal, the first clamping part is extended from the first connecting part and extended in a direction toward the first lateral disc part, and the first clamping part is located near the first lateral disc part, wherein the second connecting part is connected with the second magnetic pole terminal and the sixth magnetic pole terminal, the second clamping part is extended from the second connecting part and extended in a direction toward the second lateral disc part, and the second clamping part is located near at least one extension structure of the plural extension structures.

18. The roller module according to claim 17, wherein the second clamping part includes plural second claws, and each of the plural second claws is located near the corresponding extension structure of the plural extension structures.

19. The roller module according to claim 18, wherein the plural second claws are in the radial arrangement with the rotation axis line as the center.

20. The roller module according to claim 16, wherein when the electro-permanent magnet assembly is operated in the first operating status, a magnetic polarity of the first magnetic pole terminal, a magnetic polarity of the third magnetic pole terminal and a magnetic polarity of the fifth magnetic pole terminal are identical, wherein when the electro-permanent magnet assembly is operated in the second operating status, a magnetic polarity of the second magnetic pole terminal, the magnetic polarity of the third magnetic pole terminal and the magnetic polarity of the fifth magnetic pole terminal are identical.

21. The roller module according to claim 20, wherein when the electro-permanent magnet assembly is operated in the first operating status, the first magnetic pole terminal is an S pole terminal, the second magnetic pole terminal is an N pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal, wherein when the electro-permanent magnet assembly is operated in the second operating status, the first magnetic pole terminal is the N pole terminal, the second magnetic pole terminal is the S pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal.

22. The roller module according to claim 20, wherein when the electro-permanent magnet assembly is operated in the first operating status, the first magnetic pole terminal is an N pole terminal, the second magnetic pole terminal is an S pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal, wherein when the electro-permanent magnet assembly is operated in the second operating status, the first magnetic pole terminal is the S pole terminal, the second magnetic pole terminal is the N pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal.

23. The roller module according to claim 20, wherein when a current flows through the coil, an operating status of the electro-permanent magnet assembly is switched from the first operating status to the second operating status.

24. The roller module according to claim 16, wherein the roller module further comprises a magnetic conduction sheet, and the fourth magnetic pole terminal and the fifth magnetic pole terminal are magnetically coupled with each other through the magnetic conduction sheet.

25. The roller module according to claim 15, wherein the wheel disc further comprises a pivotal part and an outer disc part, and the outer disc part is arranged between the first lateral disc part and the second lateral disc part.

26. The roller module according to claim 25, wherein the roller module further comprises a supporting base, and the supporting base comprises an accommodation recess, a first pivotal hole and a second pivotal hole, wherein the wheel disc is pivotally coupled to the supporting base through the pivotal part, a portion of the wheel disc is received within the accommodation recess, and the first pivotal hole and the second pivotal hole are respectively located beside two opposite sides of the accommodation recess.

27. The roller module according to claim 26, wherein the pivotal part comprises a first rotation shaft and a second rotation shaft, wherein the first rotation shaft is externally protruded from the first lateral disc part of the wheel disc, the second rotation shaft is externally protruded from the second lateral disc part of the wheel disc, a distal end of the first rotation shaft is inserted into the first pivotal hole, and a distal end of the second rotation shaft is inserted into the second pivotal hole.

28. The roller module according to claim 27, wherein the roller module further comprises a rotation sensor, and the rotation sensor comprises a magnetic turntable and a sensing chip, wherein a rotation state of the wheel disc is detected by the sensing chip, and the magnetic turntable is sheathed around the first rotation shaft and synchronously rotated with the magnetic turntable.

29. The roller module according to claim 15, wherein the extension structures are tapered structures, and the extension structures are tapered in a direction away from the first lateral disc part of the wheel disc.

30. A roller module, comprising:

a wheel disc having magnetic conductivity, rotatable along a rotation axis line, and comprising a pivotal part, plural wheel spokes and an outer disc part, wherein the plural wheel spokes are arranged between the pivotal part and the outer disc part, and the plural wheel spokes are radially extended from the pivotal part and in a radial arrangement; and an electro-permanent magnet assembly selectively operated in a first operating status or a second operating status, wherein when the electro-permanent magnet assembly is operated in the first operating status, the electro-permanent magnet assembly provides a first magnetic attraction force to at least one wheel spoke of the plural wheel spokes in a first direction parallel with the rotation axis line, and the electro-permanent magnet assembly provides a second magnetic attraction force to at least one wheel spoke of the plural wheel spokes in a second direction parallel with the rotation axis line, wherein the first direction and the second direction are opposed to each other, wherein when the electro-permanent magnet assembly is operated in the second operating status, the electro-permanent magnet assembly provides a third magnetic attraction force to at least one wheel spoke of the plural wheel spokes in the first direction, and the electro-permanent magnet assembly provides a fourth magnetic attraction force to at least one wheel spoke of the plural wheel spokes in the second direction, wherein the first magnetic attraction force is greater than the third magnetic attraction force, and the second magnetic attraction force is greater than the fourth magnetic attraction force.

31. The roller module according to claim 30, wherein the electro-permanent magnet assembly comprises:

a first permanent magnet having a first magnetic pole terminal and a second magnetic pole terminal;

a coil wound around the first permanent magnet;

a second permanent magnet having a third magnetic pole terminal and a fourth magnetic pole terminal;

a third permanent magnet having a fifth magnetic pole terminal and a sixth magnetic pole terminal;

a first magnetic conduction block magnetically coupled with the first magnetic pole terminal and the third magnetic pole terminal; and a second magnetic conduction block magnetically coupled with the second magnetic pole terminal and the sixth magnetic pole terminal.

32. The roller module according to claim 31, wherein the first magnetic conduction block comprises a first connecting part and a first clamping part, and the second magnetic conduction block comprises a second connecting part and a second clamping part, wherein the first connecting part is connected with the first magnetic pole terminal and the third magnetic pole terminal, the first clamping part is extended in a direction toward the first lateral disc part, and the first clamping part is located near at least one wheel spoke of the plural wheel spokes, wherein the second connecting part is connected with the second magnetic pole terminal and the sixth magnetic pole terminal, the second clamping part is extended in a direction toward the second lateral disc part, and the second clamping part is located near at least one wheel spoke of the plural wheel spokes.

33. The roller module according to claim 32, wherein the first clamping part includes plural first claws, and each of the plural first claws is located near the corresponding at least one wheel spoke of the plural wheel spokes, wherein the second clamping part includes plural second claws, and each of the plural second claws is located near the corresponding at least one wheel spoke of the plural wheel spokes.

34. The roller module according to claim 33, wherein the plural first claws are in the radial arrangement with the rotation axis line as the center, and the plural second claws are in the radial arrangement with the rotation axis line as the center.

35. The roller module according to claim 31, wherein when the electro-permanent magnet assembly is operated in the first operating status, a magnetic polarity of the first magnetic pole terminal, a magnetic polarity of the third magnetic pole terminal and a magnetic polarity of the fifth magnetic pole terminal are identical, wherein when the electro-permanent magnet assembly is operated in the second operating status, a magnetic polarity of the second magnetic pole terminal, the magnetic polarity of the third magnetic pole terminal and the magnetic polarity of the fifth magnetic pole terminal are identical.

36. The roller module according to claim 35, wherein when the electro-permanent magnet assembly is operated in the first operating status, the first magnetic pole terminal is an S pole terminal, the second magnetic pole terminal is an N pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal, wherein when the electro-permanent magnet assembly is operated in the second operating status, the first magnetic pole terminal is the N pole terminal, the second magnetic pole terminal is the S pole terminal, the third magnetic pole terminal is the S pole terminal, the fourth magnetic pole terminal is the N pole terminal, the fifth magnetic pole terminal is the S pole terminal, and the sixth magnetic pole terminal is the N pole terminal.

37. The roller module according to claim 35, wherein when the electro-permanent magnet assembly is operated in the first operating status, the first magnetic pole terminal is an N pole terminal, the second magnetic pole terminal is an S pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal, wherein when the electro-permanent magnet assembly is operated in the second operating status, the first magnetic pole terminal is the S pole terminal, the second magnetic pole terminal is the N pole terminal, the third magnetic pole terminal is the N pole terminal, the fourth magnetic pole terminal is the S pole terminal, the fifth magnetic pole terminal is the N pole terminal, and the sixth magnetic pole terminal is the S pole terminal.

38. The roller module according to claim 35, wherein when a current flows through the coil, an operating status of the electro-permanent magnet assembly is switched from the first operating status to the second operating status.

39. The roller module according to claim 31, wherein the roller module further comprises a magnetic conduction sheet, and the fourth magnetic pole terminal and the fifth magnetic pole terminal are magnetically coupled with each other through the magnetic conduction sheet.

40. The roller module according to claim 30, wherein the roller module further comprises a supporting base, and the supporting base comprises an accommodation recess, a first pivotal hole and a second pivotal hole, wherein the wheel disc is pivotally coupled to the supporting base through the pivotal part, a portion of the wheel disc is received within the accommodation recess, and the first pivotal hole and the second pivotal hole are respectively located beside two opposite sides of the accommodation recess.

41. The roller module according to claim 40, wherein the pivotal part comprises a first rotation shaft and a second rotation shaft, wherein the first rotation shaft is externally protruded from the first lateral disc part of the wheel disc, the second rotation shaft is externally protruded from the second lateral disc part of the wheel disc, a distal end of the first rotation shaft is inserted into the first pivotal hole, and a distal end of the second rotation shaft is inserted into the second pivotal hole.

42. The roller module according to claim 41, wherein the roller module further comprises a rotation sensor, and the rotation sensor comprises a magnetic turntable and a sensing chip, wherein a rotation state of the wheel disc is detected by the sensing chip, and the magnetic turntable is sheathed around the first rotation shaft and synchronously rotated with the magnetic turntable.

* * * * *